United States Patent
Humphries et al.

(10) Patent No.: US 12,045,864 B1
(45) Date of Patent: *Jul. 23, 2024

(54) DETERMINE REGIONAL RATE OF RETURN ON HOME IMPROVEMENTS

(71) Applicant: MFTB Holdco, Inc., Seattle, WA (US)

(72) Inventors: Stanley B. Humphries, Sammamish, WA (US); Matthew Carl Fix, Seattle, WA (US); Svenja Maarit Gudell, Redmond, WA (US)

(73) Assignee: MFTB Holdco, Inc., Seattle, WA (US)

( * ) Notice: Subject to any disclaimer, the term of this patent is extended or adjusted under 35 U.S.C. 154(b) by 455 days.

This patent is subject to a terminal disclaimer.

(21) Appl. No.: 17/373,446

(22) Filed: Jul. 12, 2021

Related U.S. Application Data

(63) Continuation of application No. 14/721,437, filed on May 26, 2015, now Pat. No. 11,093,982.

(60) Provisional application No. 62/059,048, filed on Oct. 2, 2014.

(51) Int. Cl.
  *G06Q 30/02* (2023.01)
  *G06Q 50/16* (2012.01)
(52) U.S. Cl.
  CPC ......... *G06Q 30/0278* (2013.01); *G06Q 50/16* (2013.01)
(58) Field of Classification Search
  USPC ....................................................... 705/306
  See application file for complete search history.

(56) References Cited

U.S. PATENT DOCUMENTS

| | | | |
|---|---|---|---|
| 398,406 | A | 2/1889 | Johnson |
| 4,870,576 | A | 9/1989 | Tornetta |
| 4,964,060 | A | 10/1990 | Hartsog |
| 5,189,606 | A | 2/1993 | Burns et al. |
| 5,361,201 | A | 11/1994 | Jost et al. |
| 5,414,621 | A | 5/1995 | Hough |
| 5,461,708 | A | 10/1995 | Kahn et al. |
| 5,584,025 | A | 12/1996 | Keithley et al. |

(Continued)

FOREIGN PATENT DOCUMENTS

| | | |
|---|---|---|
| CA | 2984674 | 8/2001 |
| EP | 1903491 | 3/2008 |

(Continued)

OTHER PUBLICATIONS

Remodeling Magazine, Remodeling Cost vs Value Report 2006, 2006, Hanley Wood LLC, pp. 1-6 (Year: 2006) (Year: 2006).*

(Continued)

*Primary Examiner* — Michael Young
(74) *Attorney, Agent, or Firm* — Perkins Coie LLP

(57) ABSTRACT

A facility for estimating a home improvement rate of return for a geographic area is described. The facility accesses information about homes in the geographic area including sale prices and data describing home improvements performed on the homes, such that some of the sale prices are associated with homes having a home improvement of a particular type. The facility obtains automatic valuations for the homes based on the homes' attribute values, and calculates the differences between the automatic valuations and the sale prices. The facility analyzes the differences and the home improvement data and, based on the analysis, estimates a rate of return of the particular type of home improvement.

20 Claims, 11 Drawing Sheets

(56) References Cited

U.S. PATENT DOCUMENTS

| | | |
|---|---|---|
| 5,668,736 A | 9/1997 | Douglas et al. |
| 5,680,305 A | 10/1997 | Apgar, IV |
| 5,754,850 A | 5/1998 | Janssen |
| 5,761,674 A | 6/1998 | Ito |
| 5,794,216 A | 8/1998 | Brown |
| 5,855,011 A | 12/1998 | Tatsuoka |
| 5,857,174 A | 1/1999 | Dugan |
| 5,893,082 A | 4/1999 | McCormick |
| 5,918,219 A | 6/1999 | Isherwood |
| 6,115,694 A | 9/2000 | Cheetham et al. |
| 6,178,406 B1 | 1/2001 | Cheetham et al. |
| 6,240,425 B1 | 5/2001 | Naughton |
| 6,260,033 B1 | 7/2001 | Tatsuoka |
| 6,301,571 B1 | 10/2001 | Tatsuoka |
| 6,397,208 B1 | 5/2002 | Lee |
| 6,401,070 B1 | 6/2002 | McManus |
| 6,446,053 B1 | 9/2002 | Elliott |
| 6,446,261 B1 | 9/2002 | Rosser |
| 6,493,721 B1 | 12/2002 | Getchius et al. |
| 6,597,983 B2 | 7/2003 | Hancock |
| 6,609,118 B1 | 8/2003 | Khedkar et al. |
| 6,615,187 B1 | 9/2003 | Ashenmil |
| 6,618,715 B1 | 9/2003 | Johnson et al. |
| 6,684,196 B1 | 1/2004 | Mini et al. |
| 6,760,707 B2 | 7/2004 | Provost |
| 6,876,955 B1 | 4/2005 | Fleming |
| 6,877,015 B1 | 4/2005 | Kilgore |
| 6,915,206 B2 | 7/2005 | Sasajima |
| 6,996,503 B2 | 2/2006 | Jung |
| 7,016,866 B1 | 3/2006 | Chin et al. |
| 7,092,918 B1 | 8/2006 | Delurgio et al. |
| 7,120,599 B2 | 10/2006 | Keyes |
| 7,130,810 B2 | 10/2006 | Foster et al. |
| 7,219,078 B2 | 5/2007 | Lamont et al. |
| 7,225,249 B1 | 5/2007 | Barry et al. |
| 7,249,146 B2 | 7/2007 | Brecher |
| 7,254,553 B2 | 8/2007 | Fogelson |
| 7,283,975 B2 | 10/2007 | Broughton |
| 7,289,965 B1 | 10/2007 | Bradley et al. |
| 7,389,242 B2 | 6/2008 | Frost |
| 7,454,355 B2 | 11/2008 | Milman et al. |
| 7,461,265 B2 | 12/2008 | Ellmore |
| 7,487,114 B2 | 2/2009 | Florance et al. |
| 7,567,262 B1 | 7/2009 | Clemens et al. |
| 7,636,687 B2 | 12/2009 | Foster et al. |
| 7,711,574 B1 | 5/2010 | Bradley et al. |
| 7,725,359 B1 | 5/2010 | Katzfey et al. |
| 7,752,065 B2 | 7/2010 | Buzz |
| 7,783,523 B2 | 8/2010 | Lopez et al. |
| 7,783,562 B1 | 8/2010 | Ellis |
| 7,788,186 B1 | 8/2010 | An et al. |
| 7,818,219 B2 | 10/2010 | Klivington |
| 7,827,128 B1 | 11/2010 | Yan et al. |
| 7,844,503 B2 | 11/2010 | Fogelson |
| 7,848,966 B2 | 12/2010 | Charuk et al. |
| 7,933,798 B1 | 4/2011 | Yan et al. |
| 7,962,353 B1 | 6/2011 | Menzies |
| 7,970,674 B2 | 6/2011 | Cheng et al. |
| 8,001,024 B2 | 8/2011 | Graboske et al. |
| 8,001,160 B2 | 8/2011 | Weisflog |
| 8,015,091 B1 | 9/2011 | Ellis |
| 8,032,401 B2 | 10/2011 | Choubey |
| 8,051,089 B2 | 11/2011 | Gargi et al. |
| 8,065,123 B2 | 11/2011 | Wood |
| 8,095,434 B1 | 1/2012 | Puttick et al. |
| 8,140,421 B1 | 3/2012 | Humphries et al. |
| 8,180,697 B2 | 5/2012 | Frischer |
| 8,190,516 B2 | 5/2012 | Ghosh et al. |
| 8,234,205 B1 | 7/2012 | Harrington |
| 8,370,267 B2 | 2/2013 | Carey et al. |
| 8,386,395 B1 | 2/2013 | Gordon et al. |
| 8,401,877 B2 | 3/2013 | Salvagio |
| 8,407,120 B1 | 3/2013 | Gordon et al. |
| 8,433,512 B2 | 4/2013 | Lopatenko |
| 8,473,347 B1 | 6/2013 | Koningstein |
| 8,510,196 B1 | 8/2013 | Brandmaier et al. |
| 8,515,839 B2 | 8/2013 | Ma et al. |
| 8,521,619 B2 | 8/2013 | Perry, III et al. |
| 8,583,562 B1 | 11/2013 | McDaniel |
| 8,628,151 B1 | 1/2014 | Allen |
| 8,650,067 B1 | 2/2014 | Moss |
| 8,660,919 B2 | 2/2014 | Kasower |
| 8,676,680 B2 | 3/2014 | Humphries et al. |
| 8,688,461 B1 | 4/2014 | Richards |
| 8,706,646 B2 | 4/2014 | Jannott et al. |
| 8,712,893 B1 | 4/2014 | Brandmaier et al. |
| 8,719,041 B2 | 5/2014 | Verex |
| 8,731,234 B1 | 5/2014 | Ciarcia et al. |
| 8,775,300 B2 | 7/2014 | Showalter |
| 8,923,551 B1 | 12/2014 | Grosz et al. |
| 9,536,011 B1 | 1/2017 | Kirillov |
| 9,605,704 B1 | 3/2017 | Humphries et al. |
| 10,074,111 B2 | 9/2018 | Humphries |
| 10,198,735 B1 | 2/2019 | Humphries et al. |
| 10,332,138 B1 | 6/2019 | Bruce et al. |
| 10,346,887 B1 | 7/2019 | Shariff et al. |
| 10,380,653 B1 | 8/2019 | Flint et al. |
| 10,460,406 B1 | 10/2019 | Humphries et al. |
| 10,643,232 B1 | 5/2020 | Wang et al. |
| 10,754,884 B1 | 8/2020 | Daimler et al. |
| 10,789,549 B1 | 9/2020 | Bruce et al. |
| 10,896,449 B2 | 1/2021 | Ma |
| 10,984,489 B1 | 4/2021 | Bruce et al. |
| 11,068,911 B1 | 7/2021 | Humphries |
| 11,232,142 B2 | 1/2022 | Daimler et al. |
| 11,244,361 B2 | 2/2022 | Humphries |
| 11,288,756 B1 | 3/2022 | Humphries et al. |
| 11,315,202 B2 | 4/2022 | VanderMey |
| 11,354,701 B1 | 6/2022 | Wang et al. |
| 11,449,958 B1 | 9/2022 | Humphries et al. |
| 11,494,794 B1 | 11/2022 | Bruce et al. |
| 11,687,959 B2 | 6/2023 | Abdallah et al. |
| 11,727,449 B2 | 8/2023 | Flint et al. |
| 11,769,181 B2 | 9/2023 | Humphries et al. |
| 11,861,747 B1 | 1/2024 | Humphries |
| 2001/0025229 A1 | 9/2001 | Moritz et al. |
| 2001/0032062 A1 | 10/2001 | Plaskoff et al. |
| 2001/0039506 A1 | 11/2001 | Robbins |
| 2001/0044766 A1 | 11/2001 | Keyes |
| 2001/0047250 A1 | 11/2001 | Schuller et al. |
| 2002/0007336 A1 | 1/2002 | King et al. |
| 2002/0035520 A1 | 3/2002 | Weiss |
| 2002/0052814 A1 | 5/2002 | Ketterer |
| 2002/0065739 A1 | 5/2002 | Florance et al. |
| 2002/0082903 A1 | 6/2002 | Yasuzawa et al. |
| 2002/0087389 A1 | 7/2002 | Sklarz et al. |
| 2002/0099725 A1 | 7/2002 | Gordon |
| 2002/0116163 A1 | 8/2002 | Loveland |
| 2002/0120554 A1 | 8/2002 | Vega |
| 2002/0188689 A1 | 12/2002 | Michael |
| 2003/0004781 A1 | 1/2003 | Mallon |
| 2003/0149658 A1 | 1/2003 | Rossbach et al. |
| 2003/0028393 A1 | 2/2003 | Coulston et al. |
| 2003/0046099 A1 | 3/2003 | Lamont et al. |
| 2003/0055747 A1 | 3/2003 | Carr et al. |
| 2003/0078878 A1 | 4/2003 | Opsahi-Ong |
| 2003/0078897 A1 | 4/2003 | Florance et al. |
| 2003/0101063 A1 | 5/2003 | Sexton et al. |
| 2003/0101074 A1 | 5/2003 | Suzuki et al. |
| 2003/0110122 A1 | 6/2003 | Nalebuff et al. |
| 2003/0115164 A1 | 6/2003 | Jeng |
| 2003/0171957 A1 | 9/2003 | Watrous |
| 2003/0191723 A1 | 10/2003 | Foretich et al. |
| 2003/0212565 A1 | 11/2003 | Badali et al. |
| 2004/0019517 A1 | 1/2004 | Sennott |
| 2004/0024773 A1 | 2/2004 | Stoffel |
| 2004/0030616 A1 | 2/2004 | Florance et al. |
| 2004/0039629 A1 | 2/2004 | Hoffman et al. |
| 2004/0049440 A1 | 3/2004 | Shinoda et al. |
| 2004/0054568 A1 | 3/2004 | Bradley et al. |
| 2004/0054605 A1 | 3/2004 | Whittet |
| 2004/0059688 A1 | 3/2004 | Dominguez et al. |
| 2004/0073508 A1 | 4/2004 | Foster et al. |
| 2004/0093270 A1 | 5/2004 | Gilbert |

(56) References Cited

U.S. PATENT DOCUMENTS

| | | |
|---|---|---|
| 2004/0128215 A1 | 7/2004 | Florance |
| 2004/0153330 A1 | 8/2004 | Miller |
| 2004/0153663 A1 | 8/2004 | Clark et al. |
| 2004/0186763 A1 | 9/2004 | Smith |
| 2004/0193474 A1 | 9/2004 | Digiacomo |
| 2004/0220872 A1 | 11/2004 | Pollock |
| 2004/0243470 A1 | 12/2004 | Ozer et al. |
| 2004/0254803 A1 | 12/2004 | Myr |
| 2004/0267657 A1 | 12/2004 | Hecht |
| 2005/0071376 A1 | 3/2005 | Modi |
| 2005/0080702 A1 | 4/2005 | Modi |
| 2005/0081161 A1 | 4/2005 | MacInnes et al. |
| 2005/0240429 A1 | 4/2005 | Dieden et al. |
| 2005/0108084 A1 | 5/2005 | Ramamoorti et al. |
| 2005/0144147 A1 | 6/2005 | Lee |
| 2005/0154656 A1 | 7/2005 | Kim et al. |
| 2005/0154657 A1 | 7/2005 | Kim et al. |
| 2005/0154664 A1 | 7/2005 | Guy et al. |
| 2005/0187778 A1 | 8/2005 | Mitchell |
| 2005/0192930 A1 | 9/2005 | Hightower et al. |
| 2005/0254803 A1 | 11/2005 | Myr |
| 2005/0288942 A1 | 12/2005 | Graboske et al. |
| 2005/0288957 A1 | 12/2005 | Eraker |
| 2005/0289108 A1 | 12/2005 | Carol et al. |
| 2006/0015357 A1 | 1/2006 | Cagan |
| 2006/0020424 A1 | 1/2006 | Quindel |
| 2006/0080114 A1 | 4/2006 | Bakes et al. |
| 2006/0085210 A1 | 4/2006 | Owens |
| 2006/0089842 A1 | 4/2006 | Medawar |
| 2006/0105342 A1 | 5/2006 | Villena et al. |
| 2006/0122918 A1 | 6/2006 | Graboske et al. |
| 2006/0248555 A1 | 6/2006 | Eldering |
| 2006/0155571 A1 | 7/2006 | Almeida et al. |
| 2006/0167710 A1 | 7/2006 | King et al. |
| 2006/0287810 A1 | 12/2006 | Sadri et al. |
| 2007/0005373 A1 | 1/2007 | Villena et al. |
| 2007/0027564 A1 | 2/2007 | Walters |
| 2007/0043770 A1 | 2/2007 | Goodrich et al. |
| 2007/0050342 A1 | 3/2007 | Inkinen et al. |
| 2007/0061774 A1 | 3/2007 | Chan et al. |
| 2007/0067180 A1 | 3/2007 | James et al. |
| 2007/0073610 A1 | 3/2007 | Marugabandhu et al. |
| 2007/0106523 A1 | 5/2007 | Eaton et al. |
| 2007/0124235 A1 | 5/2007 | Chakraborty et al. |
| 2007/0132727 A1 | 6/2007 | Garbow et al. |
| 2007/0143312 A1 | 6/2007 | Wiseman |
| 2007/0150353 A1 | 6/2007 | Krassner |
| 2007/0244780 A1 | 10/2007 | Liu |
| 2007/0255581 A1 | 11/2007 | Otto et al. |
| 2007/0265960 A1 | 11/2007 | Advani |
| 2008/0004893 A1 | 1/2008 | Graboske et al. |
| 2008/0015890 A1 | 1/2008 | Malyala |
| 2008/0027857 A1 | 1/2008 | Benson |
| 2008/0077458 A1 | 3/2008 | Andersen et al. |
| 2008/0086356 A1 | 4/2008 | Glassman et al. |
| 2008/0103908 A1 | 5/2008 | Munk |
| 2008/0109409 A1 | 5/2008 | Hengel |
| 2008/0133319 A1 | 6/2008 | Adiga et al. |
| 2008/0183598 A1 | 7/2008 | Carr et al. |
| 2008/0255914 A1 | 10/2008 | Oren |
| 2008/0255921 A1 | 10/2008 | Flake et al. |
| 2008/0262789 A1 | 10/2008 | Pershing et al. |
| 2008/0288312 A1 | 11/2008 | Miles et al. |
| 2008/0288335 A1 | 11/2008 | Goldberg |
| 2008/0301064 A1 | 12/2008 | Burns |
| 2008/0312942 A1 | 12/2008 | Katta et al. |
| 2009/0006185 A1 | 1/2009 | Stinson |
| 2009/0030707 A1 | 1/2009 | Green |
| 2009/0030864 A1 | 1/2009 | Pednault et al. |
| 2009/0037328 A1 | 2/2009 | Abuaf |
| 2009/0043603 A1 | 2/2009 | Rutherford et al. |
| 2009/0043637 A1 | 2/2009 | Eder |
| 2009/0048938 A1 | 2/2009 | Dupray |
| 2009/0076902 A1 | 3/2009 | Grinsted et al. |
| 2009/0132316 A1 | 5/2009 | Florance et al. |
| 2009/0132436 A1 | 5/2009 | Pershing et al. |
| 2009/0144097 A1 | 6/2009 | Fassio et al. |
| 2009/0144314 A1 | 6/2009 | Vignet et al. |
| 2009/0150216 A1 | 6/2009 | Milman et al. |
| 2009/0164383 A1 | 6/2009 | Rothman |
| 2009/0164464 A1 | 6/2009 | Carrico et al. |
| 2009/0174768 A1 | 7/2009 | Blackburn et al. |
| 2009/0210287 A1 | 8/2009 | Chickering et al. |
| 2009/0240586 A1 | 9/2009 | Ramer et al. |
| 2009/0265193 A1 | 10/2009 | Collins et al. |
| 2009/0265285 A1 | 10/2009 | Balaishis |
| 2009/0287596 A1 | 11/2009 | Torrenegra |
| 2010/0005019 A1 | 1/2010 | Yang et al. |
| 2010/0023379 A1 | 1/2010 | Rappaport |
| 2010/0076881 A1 | 3/2010 | O'Grady |
| 2010/0094548 A1 | 4/2010 | Tadman et al. |
| 2010/0110074 A1 | 5/2010 | Pershing |
| 2010/0114678 A1 | 5/2010 | Axe et al. |
| 2010/0161471 A1 | 6/2010 | Fendick |
| 2010/0161495 A1 | 6/2010 | Olson et al. |
| 2010/0161498 A1 | 6/2010 | Walker |
| 2010/0211421 A1 | 8/2010 | Sciammarella et al. |
| 2010/0318451 A1 | 12/2010 | Niccolini |
| 2011/0047083 A1 | 2/2011 | Lawler |
| 2011/0066510 A1 | 3/2011 | Talegon |
| 2011/0066561 A1 | 3/2011 | Lazarre et al. |
| 2011/0071899 A1 | 3/2011 | Robertson et al. |
| 2011/0196762 A1 | 8/2011 | DuPont |
| 2011/0218934 A1 | 9/2011 | Elser |
| 2011/0218937 A1 | 9/2011 | Elser |
| 2011/0251967 A1 | 10/2011 | Klivington |
| 2011/0251974 A1 | 10/2011 | Woodward et al. |
| 2011/0270779 A1 | 11/2011 | Showalter |
| 2012/0005111 A2 | 1/2012 | Lowenstein et al. |
| 2012/0011075 A1 | 1/2012 | Graboske et al. |
| 2012/0030092 A1 | 2/2012 | Marshall et al. |
| 2012/0072357 A1 | 3/2012 | Bradford |
| 2012/0078770 A1 | 3/2012 | Hecht |
| 2012/0101783 A1 | 4/2012 | Stephens et al. |
| 2012/0254045 A1 | 4/2012 | Orfano |
| 2012/0158459 A1 | 6/2012 | Villena et al. |
| 2012/0167047 A1 | 6/2012 | Wyler et al. |
| 2012/0191541 A1 | 7/2012 | Yang et al. |
| 2012/0303536 A1 | 11/2012 | Wierks |
| 2012/0311431 A1 | 12/2012 | Breaker et al. |
| 2012/0323798 A1 | 12/2012 | Den Herder |
| 2012/0330719 A1 | 12/2012 | Malaviya et al. |
| 2013/0041841 A1 | 2/2013 | Lyons |
| 2013/0103459 A1 | 4/2013 | Marshall et al. |
| 2013/0103595 A1 | 4/2013 | Berry et al. |
| 2013/0159166 A1 | 6/2013 | Irick |
| 2013/0304654 A1 | 7/2013 | Ma et al. |
| 2013/0211790 A1 | 8/2013 | Loveland et al. |
| 2013/0275252 A1 | 10/2013 | Martin et al. |
| 2013/0332877 A1 | 12/2013 | Florance et al. |
| 2013/0339255 A1 | 12/2013 | Talbird |
| 2013/0346151 A1 | 12/2013 | Bleakley et al. |
| 2014/0012720 A1 | 1/2014 | O'Kane |
| 2014/0236845 A1 | 1/2014 | Humphries et al. |
| 2014/0058961 A1 | 2/2014 | McDaniel |
| 2014/0095122 A1 | 4/2014 | Appleman et al. |
| 2014/0180936 A1 | 6/2014 | Ma et al. |
| 2014/0316999 A1 | 6/2014 | Cheng et al. |
| 2014/0222608 A1 | 8/2014 | Cohen et al. |
| 2014/0229212 A1 | 8/2014 | MacElheron et al. |
| 2014/0257924 A1 | 9/2014 | Xie et al. |
| 2014/0279692 A1* | 9/2014 | Boothby ............... G06Q 40/06 705/36 R |
| 2014/0297479 A1 | 10/2014 | McCloskey et al. |
| 2014/0316857 A1 | 10/2014 | Roberts |
| 2014/0372203 A1 | 12/2014 | Powell et al. |
| 2015/0006311 A1 | 1/2015 | Murugappan et al. |
| 2015/0006605 A1 | 1/2015 | Chu et al. |
| 2015/0012335 A1 | 1/2015 | Xie et al. |
| 2015/0066834 A1 | 3/2015 | Jeffries |
| 2015/0088766 A1 | 3/2015 | Krause |
| 2015/0112874 A1 | 4/2015 | Serio |
| 2015/0149275 A1 | 5/2015 | Bax et al. |
| 2015/0186953 A1 | 7/2015 | Gross |

(56) References Cited

U.S. PATENT DOCUMENTS

| | | | |
|---|---|---|---|
| 2015/0242747 | A1 | 8/2015 | Packes et al. |
| 2015/0269264 | A1 | 9/2015 | Bolen |
| 2015/0339265 | A1 | 11/2015 | Thibaux |
| 2015/0356576 | A1 | 12/2015 | Malaviya |
| 2015/0379430 | A1 | 12/2015 | Dirac |
| 2016/0048934 | A1 | 2/2016 | Gross |
| 2016/0171622 | A1 | 6/2016 | Perkins et al. |
| 2016/0246863 | A1 | 8/2016 | Sexton et al. |
| 2016/0267397 | A1 | 9/2016 | Carlsson |
| 2016/0292763 | A1 | 10/2016 | Goodrich et al. |
| 2016/0292800 | A1 | 10/2016 | Smith |
| 2017/0365019 | A1 | 12/2017 | He et al. |
| 2018/0114600 | A1 | 4/2018 | Roberts et al. |
| 2018/0232787 | A1 | 8/2018 | Dupray |
| 2018/0329959 | A1 | 11/2018 | Cao |
| 2019/0019261 | A1 | 1/2019 | Lammert, Jr. et al. |
| 2020/0210610 | A1 | 7/2020 | Nerurkar |
| 2020/0349176 | A1 | 11/2020 | Daimler et al. |
| 2022/0114623 | A1 | 4/2022 | Humphries et al. |

FOREIGN PATENT DOCUMENTS

| | | | |
|---|---|---|---|
| JP | 2003854023 | 3/2003 | |
| JP | 2017167893 | 9/2017 | |
| KR | 20200031577 | 3/2020 | |
| WO | 0055771 | 9/2000 | |
| WO | 0211038 | 2/2002 | |
| WO | 0242980 | 5/2002 | |
| WO | 03100692 | 12/2003 | |
| WO | 2005015441 | 2/2005 | |
| WO | 2006025830 | 3/2006 | |
| WO | 2006043951 | 4/2006 | |
| WO | 2007051892 | 5/2007 | |
| WO | WO-2014137510 A1 * | 9/2014 | ........... G06Q 10/067 |

OTHER PUBLICATIONS

Remodeling Magazine, Remodeling Cost vs Value Report 2006, 2006, Hanley Wood LLC, pp. 1-6 (Year: 2006).*

"2002 Inman Innovator Award Nominees Announced," PR Newswire, Jul. 16, 2002, 3 pages.

"About Reis, Products & Services," [online], Retrieved from the Internet via the Wayback Machine dated Feb. 5, 2002 on Jun. 13, 2013, URL: http://reis.com/about/aboutproducts_rentcomps.cfm, 2 pages.

"An Introduction to R," <http://web.archive.org/web/20060118050840/http://cran.r-project.org/doc/manuals/R-intro.html>, [internet archive date: Jan. 18, 2006], pp. 1-105.

"Banton Technologies Announces National Home Evaluation Coverage; Company's ValueWizard 3.0 Assesses All Regions of the United States," Business Wire, Jun. 10, 2003, [online] Retrieved from the Internet: URL: http://www.thefreelibrary.com/_/print/PrintArticle.aspx?id=102949279, 2 pages.

"Basis100 Partners to Offer Automated Valuation Service," Canada StockWatch, Jan. 27, 2004, 2 pages.

"Basis100 Partners with First American," PR Newswire, Jan. 27, 2004, 3 pages.

"Casa(TM) to Value More Than $100 Billion of Residential Real Estate in 2001—Leading Lenders Saving Big without Compromising Loan Quality," PR Newswire, May 21, 2001, 3 pages.

"Centre for Mathematical Sciences," Lund University, http://web.archive.org/web/20060101005103/http://www.maths.lth.se/, [internet archive date: Jan. 1, 2006], 1 page.

"Directory of Valuation Providers, Your Source for Valuation Information," Zackin Publications Inc., 2004, 5 pages.

"First American Expands Real Estate Valuation Line, Aims to Increase Accuracy with Addition of Veros, Basis100 AVMs," Inman News, Mar. 15, 2004, 2 pages.

"First American Real Estate Solutions Experiences Record," PR Newswire, Nov. 4, 2002, 3 pages.

"First American Real Estate Solutions Releases ValuePoint4," PR Newswire, Oct. 21, 2002, 3 pages.

"First American Real Estate Solutions' ValuePoint(R)4 Experiences Explosive Growth in 2004—Leading Automated Valuation Model (AVM) Usage Grows More Than 700 Percent in 12-Month Period," PR Newswire, Mar. 24, 2005, 3 pages.

"Franchise Offering Circular for Prospective Franchisees," U.S. Appraisal, Nov. 1, 1986, 87 pages.

"GMAC-RFC Selects First American Real Estate Solutions' ValuePoint(R)4 Automated Valuation Model (AVM)," PR Newswire, Jun. 28, 2004, 3 pages.

"HNC Software and RealQuest Team to Provide Widespread Automated Property Valuation; Areas Users to Have Online Access to Texas MLS," Business Wire, Oct. 1, 1997, 3 pages.

"HomeAdvisor Ranks First in Gomez Poll," Realty Times, Jun. 13, 2001, 3 pages.

"HomeAdvisor Spin-Off Aims to Service Realty Industry," Directions on Microsoft, Apr. 24, 2000, 2 pages.

"HomeSeekers.com and MSN HomeAdvisor Provide Free Web Pages For All Real Estate Agents," PR Newswire, May 20, 1999, 3 pages.

"How do we value your home?," [online] CSW Online, Retrieved from the Internet via the Wayback Machine dated Oct. 23, 1999, URL: http://www.cswonline.com/method.shtml, 1 page.

"In Brief: HomeAdvisor Secures $100 Million in Equity Funding," Directions on Microsoft, Aug. 28, 2000, 1 page.

"Microsoft Real Estate Venture Gets Large Investment," The New York Times, Technology section, Aug. 23, 2000, 2 pages.

"MSN HomeAdvisor Becomes Most-Visited Home and Real Estate Web Site, According to Media Metrix," Microsoft News Center, Apr. 13, 2001, Retrieved from the Internet: URL: http://www.microsoft.com/enus/news/press/2001/Apr01/04-13MarchTrafficPR.aspx?navV3Index=0, 2 pages.

"MSN HomeAdvisor Helps Real Estate Agents and Customers Feel Right at Home on the Internet," Microsoft News Center, Dec. 14, 1998, Retrieved from the Internet: URL: http://www.microsoft.com/enus/news/features/1998/12-14msn.aspx?navV3Index=0, 2 pages.

"Nation's First Fully Interactive AVM Debuts in Las Vegas AVM News," PRweb press release, AVM News, Feb. 4, 2006, 1 page.

"NetNumina Solutions Creates Robust E-Business Solution for Leader in Real Estate Lending," PR Newswire, Aug. 16, 1999, 3 pages.

"Reis Inc.," Commercial Property News, vol. 18, Issue 6, Mar. 16, 2004, 2 pages.

"Reis, Inc. Launches Apartment Version of Online Valuation and Credit Risk Analysis Module," Business Wire, Nov. 7, 2002, 2 pages.

"RMBS: Guidelines for the Use of Automated Valuation Models for U.K. RMBS Transactions," StandardandPoors.com [online], Sep. 26, 2005 [retrieved Aug. 6, 2013], Retrieved from the Internet, S&P Archive: URL: www.standardandpoors.com/prot/ratings/articles/en/us/?articleType=HTML&assetID=1245330509010, 4 pages.

"Sample CASA Report," [online] CSW Online, Retrieved from the Internet via the Wayback Machine dated Nov. 6, 1999, URL: http://www.cswonline.com/sample.shtml, 3 pages.

"Standard on Automated Valuation Models (AVMs)", International Association of Assessing Officers, Approved Sep. 2003, 36 pages.

"The Appraisal" Report, U.S. Appraisal, dated at least by Sep. 29, 1983, 4 pages.

"The Appraiser," Certificate of Copyright Registration, Jun. 25, 1982, 4 pages.

"The Appraiser," Certificate of Copyright Registration, Oct. 19, 1981, 3 pages.

"The Assessor" Demo Video, U.S. Appraisal, [Accessed for review on Jun. 21, 2013, *Zillow Inc.* vs. *Trulia* Case No. 2:12-cv-01549-JLR], [Transcribed Oct. 8, 2013], 10 pages.

"The Assessor" Newsletter, US Appraisal, dated at least by Apr. 10, 1985, 4 pages.

"The Assessor" Source Code, U.S. Appraisal, [Accessed for review on Jun. 21, 2013, *Zillow Inc.* vs. *Trulia* Case No. 2:12-cv-01549-JLR], 2,460 pages.

"The Assessor," Certificate of Copyright Registration, Feb. 2, 1984, 2 pages.

(56) References Cited

OTHER PUBLICATIONS

"The Comprehensive R Archive Network,", www.cran.r-project.org, http://web.archive.org/web/20050830073913/cran.r-project.org/banner.shtml, [internet archive date: Aug. 30, 2005], pp. 1-2.
"The R Project for Statistical Computing," www.r-project.org, http://web.archive.org/web/20060102073515/www.r-project.org/main.shtml, [internet archive date: Jan. 2, 2006], 1 page.
"TransUnion Acquires Banton Technologies," PR Newswire, Oct. 20, 2003, 3 pages.
"TransUnion and CSW Form Partnership," Mortgage Banking, vol. 62, Issue 6, Mar. 31, 2002, 1 page.
"Trulia Estimates," [online], Retrieved from the Internet via the Wayback Machine dated Jan. 16, 2013, URL: http//www.trulia.com/trulia_estimates/, 2 pages.
"Uniform Standards of Professional Appraisal Practice and Advisory Opinions 2005 Edition<" Electronic USPAP 2005 Edition, Appraisal Standards Board, The Appraisal Foundation, Effective Jan. 1, 2005, 10 pages.
"USPAP Q&A," vol. 9, No. 6, The Appraisal Foundation, Jun. 2007, 2 pages.
"What Is an AVM?", Real-Info.com [online], Dec. 22, 2005 [retrieved on Aug. 6, 2013]. Retrieved from the Internet via Internet Archive Wayback Machine: URL: web.archive.org/web/20051222120807/http://www.real-info.com/products_avm.asp?RISID=e8fc23a9a1189fbff9b9b8e8f86ccde6], 3 pages.
Xactware Unveils Web-Based Valuation Tool for Underwriting, PR Newswire, Dec. 10, 2002, 3 pages.
"Xactware. (Central Utah)," Utah Business, vol. 17, Issue 3, Mar. 1, 2003, 1 page.
Alford, P., "Rent Ratio Tells You Whether Renting or Buying is the Better Deal." Forbes.com, Nov. 2, 2021 pp. 1-4. <https://www.forbes.com/sites/greatspeculations/2010/11/02/rent-ratio-tells-you-whether-renting-or-buying-is-the-better-deal/?sh=701a7ed6e9d0>.
Appeal Brief for U.S. Appl. No. 11/524,048, filed Aug. 9, 2010, 20 pages.
Archer, W.R. et al., "Measuring the Importance of Location in House Price Appreciation", J. of Urban Economics, vol. 40, 1996, pp. 334-353, accessible at https://www.sciencedirect.com/science/article/pii/S0094119096900364 (accessed Feb. 26, 2018). (Year: 1996).
Assignment of Copyright to U.S. Appraisal by Flying Software, Inc., Jan. 2, 1982, 2 pages.
Australian Examiner's First Report in Australian Patent Application 2007216858, mailing date Dec. 22, 2008, 2 pages.
AVM News, Thomson Media, vol. 1, Issue Jan. 1, 2002, 23 pages.
AVM News, Thomson Media, vol. 1, Issue 10, Oct. 2002, 34 pages.
AVM News, Thomson Media, vol. 1, Issue 11, Nov. 2002, 28 pages.
AVM News, Thomson Media, vol. 1, Issue 12, Dec. 2002, 14 pages.
AVM News, Thomson Media, vol. 1, Issue 2, Feb. 2002, 13 pages.
AVM News, Thomson Media, vol. 1, Issue 3, Mar. 2002, 21 pages.
AVM News, Thomson Media, vol. 1, Issue 4, Apr. 2002, 24 pages.
AVM News, Thomson Media, vol. 1, Issue 5, May 2002, 35 pages.
AVM News, Thomson Media, vol. 1, Issue 6, Jun. 2002, 19 pages.
AVM News, Thomson Media, vol. 1, Issue 7, Jul. 2002, 24 pages.
AVM News, Thomson Media, vol. 1, Issue 8, Aug. 2002, 17 pages.
AVM News, Thomson Media, vol. 1, Issue 9, Sep. 2002, 15 pages.
AVM News, Thomson Media, vol. 10, Issue 11-12, Nov.-Dec. 2011, 70 pages.
AVM News, Thomson Media, vol. 10, Issue 1-2, Jan.-Feb. 2011, 72 pages.
AVM News, Thomson Media, vol. 10, Issue 3-4, Mar.-Apr. 2011, 100 pages.
AVM News, Thomson Media, vol. 10, Issue 5-6, May-Jun. 2011, 106 pages.
AVM News, Thomson Media, vol. 10, Issue 7-8, Jul.-Aug. 2011, 82 pages.
AVM News, Thomson Media, vol. 10, Issue 9-10, Sep.-Oct. 2011, 90 pages.
AVM News, Thomson Media, vol. 11, Issue 1-2, Jan.-Feb. 2012, 66 pages.
AVM News, Thomson Media, vol. 11, Issue 3-4, Mar.-Apr. 2012, 76 pages.
AVM News, Thomson Media, vol. 11, Issue 5-6, May-Jun. 2012, 72 pages.
AVM News, Thomson Media, vol. 2, Issue 1, Jan. 2003, 24 pages.
AVM News, Thomson Media, vol. 2, Issue 10, Oct. 2003, 31 pages.
AVM News, Thomson Media, vol. 2, Issue 11, Nov. 2003, 28 pages.
AVM News, Thomson Media, vol. 2, Issue 12, Dec. 2003, 18 pages.
AVM News, Thomson Media, vol. 2, Issue 2, Feb. 2003, 26 pages.
AVM News, Thomson Media, vol. 2, Issue 3, Mar. 2003, 29 pages.
AVM News, Thomson Media, vol. 2, Issue 4, Apr. 2003, 22 pages.
AVM News, Thomson Media, vol. 2, Issue 5, May 2003, 33 pages.
AVM News, Thomson Media, vol. 2, Issue 6, Jun. 2003, 38 pages.
AVM News, Thomson Media, vol. 2, Issue 7, Jul. 2003, 31 pages.
AVM News, Thomson Media, vol. 2, Issue 8, Aug. 2003, 24 pages.
AVM News, Thomson Media, vol. 2, Issue 9, Sep. 2003, 30 pages.
AVM News, Thomson Media, vol. 3, Issue 1, Jan. 2004, 24 pages.
AVM News, Thomson Media, vol. 3, Issue 10, Oct. 2004, 55 pages.
AVM News, Thomson Media, vol. 3, Issue 11, Nov. 2004, 54 pages.
AVM News, Thomson Media, vol. 3, Issue 12, Dec. 2004, 18 pages.
AVM News, Thomson Media, vol. 3, Issue 2, Feb. 2004, 26 pages.
AVM News, Thomson Media, vol. 3, Issue 3, Mar. 2004, 31 pages.
AVM News, Thomson Media, vol. 3, Issue 4, Apr. 2004, 36 pages.
AVM News, Thomson Media, vol. 3, Issue 5, May 2004, 37 pages.
AVM News, Thomson Media, vol. 3, Issue 6, Jun. 2004, 35 pages.
AVM News, Thomson Media, vol. 3, Issue 7, Jul. 2004, 49 pages.
AVM News, Thomson Media, vol. 3, Issue 8, Aug. 2004, 37 pages.
AVM News, Thomson Media, vol. 3, Issue 9, Sep. 2004, 31 pages.
AVM News, Thomson Media, vol. 4, Issue 1, Jan. 2005, 45 pages.
AVM News, Thomson Media, vol. 4, Issue 10, Oct. 2005, 51 pages.
AVM News, Thomson Media, vol. 4, Issue 11, Nov. 2005, 52 pages.
AVM News, Thomson Media, vol. 4, Issue 12, Dec. 2005, 56 pages.
AVM News, Thomson Media, vol. 4, Issue 2, Feb. 2005, 31 pages.
AVM News, Thomson Media, vol. 4, Issue 3, Mar. 2005, 39 pages.
AVM News, Thomson Media, vol. 4, Issue 4, Apr. 2005, 40 pages.
AVM News, Thomson Media, vol. 4, Issue 5, May 2005, 51 pages.
AVM News, Thomson Media, vol. 4, Issue 6, Jun. 2005, 34 pages.
AVM News, Thomson Media, vol. 4, Issue 7, Jul. 2005, 53 pages.
AVM News, Thomson Media, vol. 4, Issue 8, Aug. 2005, 30 pages.
AVM News, Thomson Media, vol. 4, Issue 9, Sep. 2005, 48 pages.
AVM News, Thomson Media, vol. 5, Issue 1, Jan. 2006, 58 pages.
AVM News, Thomson Media, vol. 5, Issue 10, Oct. 2006, 85 pages.
AVM News, Thomson Media, vol. 5, Issue 11, Nov. 2006, 86 pages.
AVM News, Thomson Media, vol. 5, Issue 12, Dec. 2006, 54 pages.
AVM News, Thomson Media, vol. 5, Issue 2, Feb. 2006, 53 pages.
AVM News, Thomson Media, vol. 5, Issue 3, Mar. 2006, 41 pages.
AVM News, Thomson Media, vol. 5, Issue 4, Apr. 2006, 54 pages.
AVM News, Thomson Media, vol. 5, Issue 5, May 2006, 48 pages.
AVM News, Thomson Media, vol. 5, Issue 6, Jun. 2006, 62 pages.
AVM News, Thomson Media, vol. 5, Issue 7, Jul. 2006, 74 pages.
AVM News, Thomson Media, vol. 5, Issue 8, Aug. 2006, 57 pages.
AVM News, Thomson Media, vol. 5, Issue 9, Sep. 2006, 63 pages.
AVM News, Thomson Media, vol. 6 Issue 3, Mar. 2007, 49 pages.
AVM News, Thomson Media, vol. 6, Issue 1, Jan. 2007, 42 pages.
AVM News, Thomson Media, vol. 6, Issue 10, Oct. 2007, 52 pages.
AVM News, Thomson Media, vol. 6, Issue 11, Nov. 2007, 23 pages.
AVM News, Thomson Media, vol. 6, Issue 2, Feb. 2007, 47 pages.
AVM News, Thomson Media, vol. 6, Issue 4, Apr. 2007, 59 pages.
AVM News, Thomson Media, vol. 6, Issue 5, May 2007, 66 pages.
AVM News, Thomson Media, vol. 6, Issue 6, Dec. 2007, 38 pages.
AVM News, Thomson Media, vol. 6, Issue 6, Jun. 2007, 46 pages.
AVM News, Thomson Media, vol. 6, Issue 8, Aug. 2007, 35 pages.
AVM News, Thomson Media, vol. 6, Issue 9, Sep. 2007, 37 pages.
AVM News, Thomson Media, vol. 6, Issue7, Jul. 2007, 51 pages.
AVM News, Thomson Media, vol. 7, Issue 07-08, Jul.-Aug. 2008, 56 pages.
AVM News, Thomson Media, vol. 7, Issue 1, Jan. 2008, 44 pages.
AVM News, Thomson Media, vol. 7, Issue 11-12, Nov.-Dec. 2008, 52 pages.
AVM News, Thomson Media, vol. 7, Issue 2, Feb. 2008, 35 pages.
AVM News, Thomson Media, vol. 7, Issue 3, Mar. 2008, 34 pages.
AVM News, Thomson Media, vol. 7, Issue 4, Apr. 2008, 33 pages.

(56) References Cited

OTHER PUBLICATIONS

AVM News, Thomson Media, vol. 7, Issue 4-5, May-Jun. 2008, 46 pages.
AVM News, Thomson Media, vol. 7, Issue 9-10, Sep.-Oct. 2008, 68 pages.
AVM News, Thomson Media, vol. 8, Issue 11-12, Nov.-Dec. 2009, 62 pages.
AVM News, Thomson Media, vol. 8, Issue 1-2, Jan.-Feb. 2009, 71 pages.
AVM News, Thomson Media, vol. 8, Issue 3-4, Mar.-Apr. 2009, 45 pages.
AVM News, Thomson Media, vol. 8, Issue 5-6, May-Jun. 2009, 65 pages.
AVM News, Thomson Media, vol. 8, Issue 7-8, Jul.-Aug. 2009, 71 pages.
AVM News, Thomson Media, vol. 8, Issue 9-10, Sep.-Oct. 2009, 53 pages.
AVM News, Thomson Media, vol. 9, Issue 11-12, Nov.-Dec. 2010, 75 pages.
AVM News, Thomson Media, vol. 9, Issue 1-2, Jan.-Feb. 2010, 66 pages.
AVM News, Thomson Media, vol. 9, Issue 3-4, Mar.-Apr. 2010, 63 pages.
AVM News, Thomson Media, vol. 9, Issue 5-6, May-Jun. 2010, 69 pages.
AVM News, Thomson Media, vol. 9, Issue 7-8, Jul.-Aug. 2010, 63 pages.
AVM News, Thomson Media, vol. 9, Issue 9-10, Sep.-Oct. 2010, 69 pages.
Bailey, Martin J. et al., A Regression Method for Real Estate Price Index Construction, Journal of the American Statistical Association, vol. 58, No. 304 (Dec. 1963), Published by: American Statistical Association, Stable URL: http://www.jstor.org/stable/2283324, pp. 933-942, 11 pages.
Basch, Mark, "Basis100 Sold to California Firm," The Florida Times Union, Jacksonville.com, Jul. 1, 2004, 2 pages.
Beckhart, "No Intrinsic Value: The Failure of Traditional Real Estate Appraisal Methods to Value Income-Producing Property," 66 S. Cal. L. Rev. 2251, 1993.
Bennett, Kristin P. et al . . . , "Support Vector Machines: Hype or Hallelujah?" SIGKDD Explorations, Dec. 2000, , vol. 2, issue 2, ACM SIGKDD, 13 pages.
Beracha, E., et al., "The Rent versus Buy Decision: Investigating the Needed Property Appreciation Rates to be Indifferent between Renting and Buying Property." Journal of Real Estate Practice and Education, 15(2), 71-88.
Borst, Richard A. et al., "An Evaluation of Multiple Regression Analysis, Comparable Sales Analysis and Artificial Neural Networks for the Mass Appraisal of Residential Properties in Northern Ireland," 1996, 16 pages.
Borst, Richard A. et al., "Use of GIS to Establish and Update CAMA Neighborhoods in Northern Ireland," Available prior to Sep. 1997, 9 pages.
Borst, Richard A., "A Valuation and Value Updating of Geographically Diverse Commercial Properties Using Artificial Neural Networks," 1993, 2 pages.
Borst, Richard A., "Computer Assisted Mass Appraisal, A New Growth Industry in the United States," Accessed from International Association of Assessing Officers Research and Technical Services Department, Document 00994, Dated no later than Jun. 8, 1979, 28 pages.
Borst, Richard A., "The Common Thread in Market Data Systems," World Congress on Computer-Assisted Valuation, Aug. 1-6, 1982, 14 pages.
Boston Housing Data, http://www.ics.uci.edu/~mlearn/databases/housing/housing.names, [accessed Dec. 13, 2005], 1 page.
Breiman et al., "Random Forest," Classification Description, http://www.stat.berkeley.edu/users/breiman/RandomForests/cc_home.htm, [accessed Dec. 13, 2005], pp. 1-28.
Breiman, L., "Random Forests," Machine Learning, 45, 2001, Kluwer Academic Publishers, The Netherlands, pp. 5-32.
Breiman, Leo et al., Random Forests, R Mathematical Software Package, licensed by Salford Systems, available at URL cran.r-project.org, and described at "Package 'randomForest'", version 4.6-7, Feb. 15, 2013, Published Oct. 16, 2012, available at URL cran.r-project.org/web/packages/randomforest/randomForest.pdf., 29 pages.
Calhoun, Charles A., "Property Valuation Methods and Data in the United States," Housing Finance International Journal 16.2, Dec. 2001, pp. 12-23.
Campbell, "Forced Sales and House Prices", 101 American Economic Review 2108, pp. 2108-2131, Aug. 2011.
Casa Property Valuation screen capture, dated at least by Jan. 24, 2005, 1 page.
Case, Karl E., et al., "Prices of Single Family Homes Since 1970: New Indexes for Four Cities," Cowles Foundation for Research in Economics at Yale University, New Haven, Connecticut, Discussion Paper No. 851, Oct. 1987, 54 pages.
CDR Business Solutions, LLC, What is RELAR, <http://www.relar.com/relarsystem.aspx> Aug. 24, 2011, Archived by Internet Wayback Machine <http://web.archive.org/web/20110824084613/http://www.relar.com/relarsystem.aspx> viewed Aug. 20, 2015, pp. 1-4.
Centre for Mathematical Sciences, Lund University, "Classification and Regression with Random Forest," http://web.archive.org/web/20060205051957/http://www.maths.lth.se/help/R/.R/library/randomForest/html/randomForest.html, [internet archive date: Feb. 5, 2006], pp. 1-4.
Clauretie, "Estimating the House Foreclosure Discount Corrected for Spatial Price Interdependence and Endogeneity of Marketing Time", 37 Real Estate Economics 43, pp. 44-48, 2009.
CNN.com, "America's Choice Election Center," 2012, retrieved online at <https://web.archive.org/web/20130502195425/http://www.cnn.com/election/2012/results/race/president#>. Cited in U.S. Appl. No. 16/930,603, filed Jun. 12, 2023 Non-Final Office Action, 1 page.
Complaint for Patent Infringement, Demand for Jury Trial for U.S. Pat. No. 7,970,674, Case 2:12-cv-01549-JLR, Sep. 12, 2012, 8 pages.
Consultants Estimating Manual Division of Capital Asset Management, Commonwealth of Massachusetts, Feb. 2006.
Cozzi, Guy, Real Estate Appraising from A to Z, 4th Edition, Nemmar Real Estate Training, Jan. 1, 2002, 226 pages, Parts 1-2.
Crook, Jordan, Redbeacon Home Services Marketplace Launches Android App, Refocuses on Mobile Techcrunch.com, Oct. 22, 2012.
Crowston, Kevin, et al., "Real Estate War in Cyberspace: An Emerging Electronic Market?," Syracuse University Surface, School of Information Studies (iSchool), Jan. 1, 1999, 14 pages.
Curriculum Vitae of Steven R. Kursh, Ph.D., CSDP, CLP, Aug. 2013, 9 pages.
Cypress Software Introduces AVM Module for Mark IV Application; Module Provides Instant Home Appraisal for Loans Processed by the Loan-Decisioning Platform, Business Wire, Nov. 15, 2005, 2 pages.
Decision—Institution of Covered Business Method Patent Review for U.S. Pat. No. 7,970,674, Case CBM2013-00056, Entered Mar. 10, 2014, 36 pages.
Decision—Institution of Inter Partes Review for U.S. Pat. No. 7,970,674, Case No. IPR2013-00034, Apr. 2, 2013, 28 pages.
Decision on Appeal for U.S. Appl. No. 11/524,048, mailing date Oct. 19, 2012, 7 pages.
Decision on Request for Rehearing for U.S. Pat. No. 7,970,674, Case No. IPR2013-00034, Apr. 22, 2013, 5 pages.
Declaration Brooke A.M. Taylor in Support of Plaintiff Vasudevan Software, Inc.'s Motion for Sanctions Against Microstrategy, Case No. 3:11-06637-RS-PSG, Nov. 20, 2012, 3 pages.
Declaration of Dr. Richard Borst, Aug. 26, 2013, 43 pages.
Declaration of John Kilpatrick, Case No. IPR2013-00034, Jun. 14, 2013, 23 pages.
Declaration of Jordan Connors in Support of Plaintiff Vasudevan Software, Inc.'s Motion for Sanctions Against Microstrategy, Case No. 3:11-06637-RS-PSG, Nov. 20, 2012, 4 pages.

(56) References Cited

OTHER PUBLICATIONS

Declaration of Leslie V. Payne in Support of Plaintiff Vasudevan Software, Inc.'s Motion for Sanctions Against Microstrategy, Case No. 3:11-06637-RS-PSG, Nov. 20, 2012, 3 pages.
Declaration of Steven R. Kursh, Ph.D., CSDP, CLP, CBM 2013-00056, Filed Sep. 11, 2013, 108 pages.
Declaration of Steven R. Kursh, Ph.D., CSDP, CLP, CBM2014-00115, Filed Apr. 10, 2014, 108 pages.
Defendant Trulia, Inc.'s Answer to Complaint for Patent Infringement and Counterclaim, Demand for Jury Trial, Case No. 2:12-cv-01549-JLR, Mar. 1, 2013, 10 pages.
Defendant Trulia, Inc.'s Non-Infringement and Invalidity Contentions, Case No. 2:12-cv-01549-JLR, Jun. 21, 2013, 24 pages.
Defendant Trulia, Inc.'s Non-Infringement and Invalidity Contentions, Exhibit A, Case No. 2:12-cv-01549-JLR, Jun. 21, 2013, 267 pages.
Dempster, A.P. et al., "Maximum Likelihood from Incomplete Data via the Algorithm," Journal of the Royal Statistical Society, 1977, Series B 39 (1): 1-38, JSTOR 2984875, MR 0501537, [online], Retrieved from the Internet: URL: http://www.jstor.org/stable/2984875?origin=JSTOR-pdf, 38 pages.
Department of the Treasury, Internal Revenue Service, "How to Depreciate Property," Publication 946, made available at www.irs.gov by dated at least 2004, 112 pages.
Deposition Transcription of John A. Kilpatrick, Ph.D., Aug. 8, 2013, 263 pages.
Dialog NPL (Non-Patent Literatures) Search Report, dated Sep. 21, 2021 (Year: 2021).
Ding, L, et al., "The Impact of the Home Valuation Code of Conduct on Appraisal and Mortgage Outcomes: The Impact of the Home Valuation Code of Conduct." Real Estate Economics 44.3 (2016), 658-690.
Eamer, M., "ZipRealty and Redfin Integrate with Zillow's API," via the Wayback Machine as published on Oct. 23, 2006.
Eaton, Kit, Guiding D.I.Y Home Repairs or Summoning the Pros the New York Times, Nov. 28, 2012.
European Examination Report, Application No. 07018380.1, Dated May 16, 2013, 6 pages.
European Examination Report, Application No. 07018380.1, Dated Oct. 24, 2008, 6 pages.
European Examination Report, Application No. 07018380.1, Dated Nov. 8, 2012, 6 pages.
Evaluation Services, Inc. Warranty to Lender's Service, Inc., dated at least by Feb. 12, 1997, 144 pages.
Evans, Blanche, "Microsoft HomeAdvisor: Software Giant, Real Estate Portal," Realty Times, Mar. 30, 2000, 3 pages.
Evans, Blanche, The Hottest E-careers in Real Estate, Dearborn Financial Publishing Inc., 2000, 241 pages.
Examiner's Answer for U.S. Appl. No. 11/524,048, mailing date Oct. 28, 2010, 13 pages.
Fannie Mae Form 2055, Federal National Mortgage Association [online], Mar. 2005, Retrieved from the Internet: URL: https://www.fanniemae.com/content/guide_form/2055.pdf, 8 pages.
Fannie Mae Form 2075, Desktop Underwriter Property Inspection Report, Federal National Mortgage Association [online], not dated, Retrieved from the Internet: URL: https://www.fanniemae.com/content/guide_form/2075.pdf, 3 pages.
Feldman, David et al., "Mortgage Default: Classification Trees Analysis," The Pinhas Sapir Center for Development Tel-Aviv University, Discussion Paper No. Mar. 2003, Oct. 2003, 46 pages.
FHFA, "Distress-Free House Price Indexes." https://www.fhfa.gov/DataTools/Downloads/Documents/HPI_Focus_Pieces/2012Q2_HPI_N508.pdf. Jul. 13, 2014.
File History of U.S. Pat. No. 7,970,674, Dated Feb. 3, 2006-Apr. 2, 2013, 404 pages, Parts 1-4.
Final Written Decision for U.S. Pat. No. 7,970,674, Case IPR2013-00034, Entered Mar. 27, 2014, 44 pages.
Finkelstein, Brad, "PlatinumData Improving Value of Its Information," Origination News and SourceMedia, Inc., vol. 15, Section: Special Report, Section:2, Nov. 1, 2005, 2 pages.
First American Real Estate Solutions Releases ValuePoint4, AVM News, Thomson Media, vol. 1, Issue 10, Oct. 2002, pp. 28-29.
Fischer, Evan, Handy Man DIY Practically Renovates for You Pocketfullofapps.com, Jun. 19, 2012.
Fletcher, June, "High-Tech Is Coming for High-End House Sales," Wall Street Journal, Sep. 19, 1997, 1 page.
Fletcher, June, "On the Web: What's Your House Worth?," Wall Street Journal, Sep. 26, 1997, 1 page.
Fletcher, June, "Touring the Tangled Web of For-Sale-by-Owner Homes," The Wall Street Journal, Jun. 6, 1997, 1 page.
Freddie Mac Form 70, Uniform Residential Appraisal Report, Federal Home Loan Mortgage Corporation [online], Mar. 2005, Retrieved from the Internet: URL: https://www.fanniemae.com/content/guide_form/1004.pdf, 8 pages.
Freddie Mac's Home Value Explorer screen capture, dated at least by Jul. 15, 2003, 1 page.
Gelfand, A.E. et al., "The Dynamics of Location in Home Price," J. of Real Estate Fin. and Econ., vol. 29:2, 2004, pp. 149-166, accessible at https://link.springer.com/content/pdf/10.1023%2FB%3AREAL.0000035308.15346.0a.pdf (accessed Feb. 26, 2018). (Year: 2004).
Google Scholar Article NPL Search Report, Sep. 21, 2021 (Year: 2021).
Google Scholar Case Law NPL Search Report, Sep. 21, 2021 (Year: 2021).
Google, Google Trends, retrieved from the internet Oct. 12, 2015 <http://www.google.com/trends> (website address only—No document).
Graphisoft Constructor 2005 Tutorial Graphisoft, 2005, pp. 1-52.
Great Britain Examination Report in Application No. GB0701944.1, mailing date May 5, 2010, 3 pages.
Great Britain Search Report for GB0701944.1, mailing date Mar. 23, 2007, 3 pages.
Gudell, Svenja, "One More Advance in Creating a Better Price-to-Rent Ratio", retrieved from the Internet, URL: https://www.zillow.com/research/one-more-advance-in-creating-a-better-price-to-rent-ratio-2968, Jul. 27, 2012, 4 pages.
Hamzaoui, Y. E.et al., "Application of Artificial Neural Networks to Predict the Selling Price in the Real Estate Valuation Process," 2011 10th Mexican International Conference on Artificial Intelligence, Puebla, 2011, pp. 175-181 (Year: 2011).
Hansen, J.V. et al., "Partially Adaptive Econometric Methods for Regression and Classification." Computational Economics, vol. 36, (2), pp. 153-169, 2010.
Hill, T. and Lewicki, P., "K-Nearest Neighbors," Statistics Methods and Applications, 2007, http://www.statsoft.com/textbook/stknn.html, [internet accessed on [Dec. 6, 2007], 5 pages.
Himmelberg, C. et al., "Assessing High House Prices: Bubbles, Fundamentals and Misperceptions," Journal of Economic Perspectives, 2005, v19(4, Fall), pp. 1-42.
Hoag, J.W., "Towards Indices of Real Estate Value and Return." The Journal of Finance, vol. 35, No. 2, [American Finance Association, Wiley], May 1980, pp. 569-580, <https://doi.org/10.2307/2327418>.
Hochgraf, Lisa, "Tools for Top Speed," Credit Union Management, vol. 26, Issue 8, Aug. 1, 2003, 4 pages.
HomeSearch Report, [online], Retrieved from the Internet via the Wayback Machine dated Dec. 10, 2005 on Jun. 19, 2013, URL: http://homesmartreports.com/samples/samplehomesearch.htm, 3 pages.
HomeSmart About, [online], Retrieved from the Internet via the Wayback Machine dated Dec. 10, 2005 http://homesmartreports.com/hs_about.htm, 2 pages.
HomeSmart Sellers, [online], Retrieved from the Internet via the Wayback Machine dated Dec. 10, 2005 on Jun. 19, 2013, URL: http://homesmartreports.com/hs_owners.htm, 1 page.
HomeSmart Terms of Use, [online], Retrieved from the Internet via the Wayback Machine dated Dec. 10, 2005 on Jun. 19, 2013, URL: http://homesmartreports.com/hs_disclaimer.htm, 3 pages.
HomeSmartReports, [online], Retrieved from the Internet via the Wayback Machine dated Oct. 13, 2005 on Jun. 19, 2013, URL: http://homesmartreports.com/, 2 pages.

(56) References Cited

OTHER PUBLICATIONS

HomeSmartReports, [online], Retrieved from the Internet via the Wayback Machine dated Dec. 10, 2005 on Jun. 19, 2013, URL: http://homesmartreports.com/default.aspx, 1 page.
HomeTechOnline.com Web Pages Hometech, May 2000, Retrieved from Archive.org Feb. 22, 2007.
Humphries, S., "Foreclosure Liquidations Abate in the Fourth Quarter but at the Expense of Number of Homes Underwater," Zillow Research, Feb. 8, 2011, 3 pages.
Igan et al., "Global Housing Cycles," IMF Working Paper, Aug. 2012, pp. 1-55.
Indeed, Job Trends: Podcast, retrieved from the internet Oct. 12, 2015 <http://www.indeed.com/jobtrends> (website only—No document).
Infinite Regression, Certificate of Copyright Registration Filing, Apr. 2, 1984, 3 pages.
Inman, "Zilpy, the new 'Z' site in online real estate", published Feb. 7, 2008, retrieved from http://www.inman.com/2008/02/07/zilpy-new-z-site-in-online-real-estate/ on Aug. 11, 2016, 2 pages.
International Search Report and Written Opinion mailed Jan. 5, 2022 in International Application No. PCT/US21/50794, 11 pages.
Jensen, David L., "Alternative Modeling Techniques in Computer-Assisted Mass Appraisal," Property Tax Journal, vol. 6, No. 3, Sep. 1987, pp. 193-237.
Jianxiao, G. et al., "Analysis of influencing factors in real estate prices based on stochastic gradient regression model," 2009 16th International Conference on Industrial Engineering and Engineering Management, Beijing, 2009.
Jobster, Job Search Trends for Keywords and Locations, retrieved from the internet Oct. 12, 2015 <http://www.jobster.com/find/US/job/search/trends> (website only—No document).
John Battelle's Searchblog,: The Database of Intentions, Nov. 13, 2003.
Khalafallah, A. "Neural network based model for predicting housing market performance," in Tsinghua Science and Technology, vol. 13, No. S1, pp. 325-328, Oct. 2008 (Year: 2008).
Kilpatrick, John A., "The Future of Real Estate Information," Real Estate Issues, Spring 2001, 8 pages.
Kilpatrick, John A., et al., "House Price Impacts of School District Choice," South Carolina Center for Applied Real Estate Education and Research, Dec. 28, 1998, 25 pages.
Kottle, M.L., Zillow traffic up after shift; site known for real estate prices decided to add for-sale listings. San Francisco Chronicle.
Krasilovsky, Peter, "Chris Terrill Discusses ServiceMagic's Rebranding to 'Home Advisor,'" Home Advisor, Oct. 17, 2012, 5 pages.
Laird, N.M. et al., "Random-Effects Models for Longitudinal Data," Biometrics, Dec. 1982, vol. 38, No. 4, pp. 963-974, 13 pages.
Lankarge, Vicki, et al., How to Increase the Value of Your Home: Simple, Budget-Conscious Techniques and Ideas That Will Make Your Home Worth Up to $100,000 More!, McGraw-Hill, 2004, 176 pages.
Leonhardt, David, The Internet Knows What You'll Do Next, Jul. 5, 2006, http://www.nytimes.com/2006/07/05/business/05leonhardt.html?ex=1309752000&en=8be0be92819a6f8f&ei=5088&partner=rssnyt&emc=rss.
Liang, Y. et al., "Research on real estate and its application of refraining the speculation," BioTechnology, An Indian Journal, 10(9), 3160-3166, 2014.
Manski, C et al., "Monotone Instrumental Variables: With an Application to the Returns to Schooling," Econometrica 68 (Jul. 2000) pp. 997-1010.
McCluskey, William J. et al., "An Evaluation of MRA, Comparable Sales Analysis, and ANNs for the Mass Appraisal of Residential Properties in Northern Ireland," Assessment Journal, Jan./Feb. 1997, 8 pages.
McCullagh, P. et al., Generalized Linear Models, Chapman and Hall, 1989, 511 pages. Book to be mailed to USPTO.
McGarity, M., "The Values Debate," Mortgage Banking, vol. 65, Issue 6, Mar. 1, 2005, 14 pages.
McWilliams, Charlyne H., "The Tale of AVMs," Mortgage Banking, vol. 64, Issue 5, Feb. 1, 2004, 7 pages.
Melville, J., "How much should I charge to rent my house?", published Dec. 5, 2010, retrieved from http://homeguides.sfgate.com/much-should-charge-rent-house-8314.html on Aug. 11, 2016, 2 pages.
Merriam-Webster Dictionary. Definition of "Contemporaneous." Accessed Nov. 6, 2022. <https://www.merriam-webster.com/dictionary/contemporaneous>. Year 2022. 3 pages.
Meyer, Robert T., "The Learning of Multiattribute Judgment Policies," The Journal of Consumer Research, vol. 14, No. 2, Sep. 1987, 20 pages . . .
Microstrategy Inc.'s Opposition to Plaintiff Vasudevan Software, Inc.'s Motion for Sanctions, Case No. 11-CV-06637-RS-PSG, Jan. 4, 2013, 23 pages.
Mikhed, V., et al., "Testing for Bubbles in Housing Markets: A Panel Data Approach," The Journal of Real Estate Finance and Economics, vol. 38, 2007, pp. 366-386.
Miller et al., A Note on Leading Indicators of Housing Market Price Trends, vol. 1, No. 1, 1986.
Miller et al., Multiple Regression Condominium Valuation with a Touch of Behavioral Theory, The Appraisal Journal 1987.
Miller et al., Pricing Strategies and Residential Property Selling Prices, The Journal of Real Estate Research, vol. 2, No. 1, Nov. 1, 1987.
Miller et al., The Impact of Interest Rates and Employment on Nominal Housing Prices, International Real Estate Review, vol. 8 No. 1, pp. 26-42, 2005.
Mobasher B. "Classification via Decision Trees in WEKA," DePaul University, Computer Science, Telecommunications, and Information Systems, ECT 584—Web Data Mining, 2005, http://maya.cs.depaul.edu/~classes/Ect584/WEKA/classify.html, [internet accessed on Dec. 6, 2007], 5 pages.
Morton, T. Gregory, Regression Analysis Appraisal Models: Selected Topics and Issues, Center for Real Estate and Urban Economic Studies, University of Connecticut, Real Estate Report: No. 19, Oct. 1976, 85 pages.
Motion for Pro Hac Vice Admission and Exhibit A for U.S. Pat. No. 7,970,674, Case No. IPR2013-00034, Filing Date Dec. 17, 2012, 13 pages.
MRMLS Realist Tax System Foreclosure User Guide, crmls.org/help/realist_manuals/realist_foreclosure.pdf. Oct. 30, 2007.
MSN House & Home—More Useful Everyday screen capture, [online], Retrieved from the Internet via the Wayback Machine dated Mar. 23, 2003 on Jun. 19, 2013, URL: http://web.archive.org/web/20030323183505/http://houseandhome.msn.com/, 2 pages.
Mullaney, Timothy J., "A New Home Site on the Block," Bloomberg Businessweek [online], Feb. 7, 2006, Retrieved from the Internet: URL: http://www.businessweek.com/stories/2006-02-07/a-new-home-site-on-the-block, 3 pages.
Munarriz, Rick A., "Pop Goes the Bubble," The Motley Fool, Fool.com [online] Feb. 14, 2006, Retrieved from the Internet; URL: http://www.fool.com/investing/small-cap/2006/02/14/pop-goes-the-bubble.aspx, 4 pages.
Nazerzadeh, H., "Internet Advertising: Optimization and Economic Aspects," Stanford University, 2009, 6 pages.
Nerdwallet. "Love That Home's View? See How Much More You'll Pay." Apr. 4, 2018. Retrieved Apr. 14, 2022 at <https://www.nerdwallet.com/article/mortgages/how-much-does-a-view-affect-a-homes-value>, 7 pages.
New CoreLogic Data Reveals Q2 Negative Equity Declines in Hardest Hit Markets and 8 Million Negative Equity Borrowers Have Above Market Rates, CoreLogic Press Release. Sep. 13, 2011, 5 pages.
Notice of Appeal for U.S. Pat. No. 7,970,674, Case IPR2013-00034, May 1, 2014, 5 pages.
O'Brien, Jeffrey M., "What's Your House Really Worth?," Fortune [online], Feb. 15, 2007, Retrieved from the Internet: URL: http://money.cnn.com/magazines/fortune/fortune_archive/2007/02/19/8400262/index.htm, 6 pages.

(56) References Cited

OTHER PUBLICATIONS

Oladunni, T et al., "Predictive Real Estate Multiple Listing System Using MVC Architecture and Linear Regression," ISCA 24th International Conference on Software Engineering and Data Engineering, 2015.
Oladunni, T. et al., "Hedonic Housing Theory—A Machine Learning Investigation," 2016.
Oldham, Jennifer, "Pricing's Tangled Web, Consumers Using the Internet to Calculate Home Values Find that the Results—and Data They're Based on—Vary," Los Angeles Times, Jul. 30, 2000, 5 pages.
Oral Hearing Petitioner Demonstratives, U.S. Pat. No. 7,970,674, Case IPR2013-00034, Emailing date Nov. 14, 2013, 85 pages.
Oral Hearing Transcript for U.S. Pat. No. 7,970,674, Case IPR2013-00034, Held Nov. 21, 2013, Entered Feb. 20, 2014, 96 pages.
Order Authorizing Motion for Pro Hac Vice Admission for U.S. Pat. No. 7,970,674, Case No. IPR2013-00034, Filing Date Jan. 3, 2013, 4 pages.
Pagourtzi, E. et al., "Real Estate Appraisal: A Review of Valuation Methods," Journal of Property Investment & Finance, vol. 21, No. 4, 2003, pp. 383-401.
Palmquist, Raymond B., "Alternative Techniques for Developing Real Estate Price Indexes," The Review of Economics and Statistics, vol. 62, No. 3 (Aug. 1980), pp. 442-448.
PASS screen capture, dated at least by Oct. 20, 2004, 1 page.
Patent Owner's Demonstrative Exhibit for Oral Hearing, U.S. Pat. No. 7,970,674, Case IPR2013-00034, Exhibit 2023, Emailing date Nov. 21, 2013, 56 pages.
Patent Owner's Observations on Cross Examination of Dr. Richard A. Borst, Ph.D., U.S. Pat. No. 7,970,674, Case IPR2013-00034, Oct. 10, 2013, 9 pages.
Patent Owner's Response to Revised Petition for Inter Partes Review for U.S. Pat. No. 7,970,674, Case No. IPR2013-00034, Jun. 14, 2013, 41 pages.
Patent Owner's Response to the Petition for Covered Business Method Patent Review for U.S. Pat. No. 7,970,674, Case No. CBM2013-00056, Jun. 20, 2014, 72 pages.
Petition for Covered Business Method Patent Review for U.S. Pat. No. 7,970,674, CBM2013-00056, Sep. 11, 2013, 87 pages.
Petition for Covered Business Method Patent Review for U.S. Pat. No. 7,970,674, CBM2014-00115, Apr. 10, 2014, 69 pages.
Petition for Inter Partes Review for U.S. Pat. No. 7,970,674, Case No. IPR2013-00034, mailing date Oct. 26, 2012, 65 pages.
Petitioner Response to Patent Owner's Observations on Cross Examination of Dr. Richard A. Borst, Ph.D., U.S. Pat. No. 7,970,674, Case IPR2013-00034, Oct. 24, 2013, 7 pages.
Petitioner's Reply to Patent Owner Response to Petition, U.S. Pat. No. 7,970,674, Case No. IPR2013-00034, Aug. 26, 2013, 20 pages.
Phaobunjong, Kan, Parametric Cost Estimating Model for Conceptual Cost Estimating of Building Construction Projects the University of Texas at Austin, May 2002, 219 pages.
Pinheiro, J. C. et al., Mixed-Effects Models in S and S-PLUS, New York: Springer, 2000, 528 pages. Book to be mailed to USPTO.
Plaintiff Vasudevan Software, Inc.'s Notice of Motion and Motion for Sanctions Against Microstrategy, Case No. 3:11-06637-RS-PSG, Dec. 12, 2012, 23 pages.
Plaintiff Vasudevan Software, Inc.'s Reply in Support of Motion for Sanctions Against Microstrategy, Case No. 3:11-06637-RS-PSG, Jan. 24, 2013, 25 pages.
Potharst, R. et al., "Classification Trees for Problems with Monotonicity Constraints," ACM SIGKDD Explorations Newsletter 4.1, 2002, pp. 1-10.
Potharst, R. et al., "Classification Trees for Problems with Monotonicity Constraints," ERIM Report Series Research in Management, Erasmus Research Institute of Management, Apr. 2002, 39 pages.
PowerBase 6.0 screen capture, dated at least by Oct. 20, 2004, 1 page.
Prasad, Nalini et al., "Measuring Housing Price Growth—Using Stratification to Improve Median-based Measures", Reserve Bank of Australia, 2006, p. 1.
Preliminary Patent Owner Response and Exhibits for U.S. Pat. No. 7,970,674, Case No. IPR2013-00034, Feb. 15, 2013, 228 pages.
Preliminary Patent Owner Response for U.S. Pat. No. 7,970,674, Case No. CBM2013-00056, Dec. 18, 2013, 85 pages.
Preliminary Patent Owner Response for U.S. Pat. No. 7,970,674, Case No. IPR2013-00034, Feb. 15, 2013, 39 pages.
Quercia, R.G. et al., "Spatio-Temporal Measurement of House Price Appreciation in Underserved Areas," J. of Housing Research, vol. 11, 2000, available at https://pdfs.semanticscholar.org/3a44/ddfbc508f61f8952d7e440c37cfdfaf441ba.pdf (accessed Feb. 26, 2018). (Year: 2000).
Quinlan, Ross J., "C4.5: Programs for Machine Learning," Machine Learning, 1993, Morgan Kaufmann Publishers, San Francisco, CA, USA., 302 pages.
Quirk, B., "Zilpy.com launches a rental data website built in partnership with Zillow!!!", published Jan. 29, 2008, retrieved from http://www.propertymanagementmavens.com/archives/2008/1 on Aug. 11, 2016, 3 pages.
Rao, Leena, Home Services Marketplace Redbeacon Launches iPhone App to Get Quotes on the Go Techcrunch.com, Nov. 9, 2011.
Readyratios.com, "Cost Approach to Value," https://www.readyratios.com/reference/appraisal/cost_approach_to_value.html, archived on Jul. 16, 2013, https://web.archive.org/web/20130716153950/https:www.readyratios.com/reference/appraisal/cost_approach_to_value.html, viewed Oct. 30, 2018, p. 1.
Real Info Inc., RELAR Sample Report, <http://www.real-info.com/products_RELAR.asp> Aug. 18, 2010, Archived by Internet Wayback Machine <http://web.archive.org/web/20100818012252/http://www.real-info.com/products_RELAR.asp> viewed Aug. 24, 2015, pp. 1-4.
RealEstateABC.com, see paragraph headed "How do I make the estimate more accurate?" www.realestateabc.com/home-values/ <http://www.realestateabc.com/home-values/>, Internet Archive Dated: Apr. 5, 2006, [accessed Mar. 20, 2007], 4 pages.
Real-info.com, "What is an AVM," www.real-info.com/products_avm.asp? Internet Archive Date: Oct. 30, 2005, [accessed Mar. 21, 2007], 5 pages.
RealQuest.com screen capture, dated at least by Dec. 12, 2002, 1 page.
RealQuest.com screen capture, dated at least by Oct. 20, 2004, 1 page.
RealQuest.com ValuePoint R4 Report screen capture, dated at least by Sep. 30, 2002, 1 page.
RealQuest.com Vector screen capture, dated at least by Oct. 20, 2004, 1 page.
Redbeacon launches at Techcrunch50 Techcrunch, Sep. 14, 2009.
Redbeacon.com web pages—How it works Redbeacon.com, Dec. 2011, Retrieved from Archive.org Jan. 6, 2015, pp. 1-15.
Redbeacon.com web pages, "Home Services Done Right." Redbeacon.com, May 2012, Retrieved from Archive.org Jan. 6, 2015, pp. 1-33.
Redfin, https://web.archive.org/web/20060907212454/http://www.redfin.com/stingray/do/terms-ofuse?rt=fn-tl, Wayback Machine Sep. 7, 2006.
Reis SE 2.0 User Guide Book, Reis, 2004, 40 pages.
Reis SE 2.0 User Guide Book, Reis, 2005, 37 pages.
Reis Valuation and Credit Risk Analysis Module Overview, [online], Sep. 18, 2003, Retrieved from the Internet via the Wayback Machine dated Sep. 19, 2003 on Jun. 17, 2013, URL: http://www.reiscom/valuation/valuationOverview.cfm, 2 pages.
Replacement Demonstrative Exhibit for Oral Hearing, U.S. Pat. No. 7,970,674, Case IPR2013-00034, File Date Nov. 21, 2013, 83 pages.
Replacement Patent Owner's Demonstrative Exhibit for Oral Hearing, U.S. Pat. No. 7,970,674, Case IPR2013-00034, File Date Nov. 21, 2013, 36 pages.
Reply Brief for U.S. Appl. No. 11/524,048, filed Dec. 22, 2010, 6 pages.
Request for Rehearing for U.S. Pat. No. 7,970,674, Case No. IPR2013-00034, Apr. 16, 2013, 8 pages.
Requirement Under Rule 105 for U.S. Appl. No. 11/927,623, mailing date Jul. 2, 2014, 4 pages.
Response to Decision on Appeal for U.S. Appl. No. 11/524,048, filed Dec. 19, 2012, 7 pages.

(56) References Cited

OTHER PUBLICATIONS

Response to Final Office Action for U.S. Appl. No. 11/347,024, filed Mar. 4, 2011, 17 pages.
Revised Petition for Inter Partes Review for U.S. Pat. No. 7,970,674, Case No. IPR2013-00034, mailing date Nov. 13, 2012, 55 pages.
Rong, Z. et al., "A Quality Measure Method Using Gaussian Mixture Models and Divergence Measure for Speaker Identification, International Conference on Spoken Language Processing", 2006, 5 pages.
Rossini, Peter, "Using Expert Systems and Artificial Intelligence for Real Estate Forecasting," Sixth Annual Pacific-Rim Real Estate Society Conference, Sydney, Australia, Jan. 24-27, 2000, 10 pages.
Roth, JD, "Is it Better to Rent or to Buy?" Time Business, Dec. 3, 2012, 2 pages.
Rye, Owen E., "A Multiple Criteria Analysis Model for Real Estate Evaluation," Journal of Global Optimization 12.2, Mar. 1998, pp. 197-214.
Rye, Owen E., "Automated Property Assessment," Transactions of the American Association of Cost Engineers, Nov. 2004, pp. 28-32.
Sample Appraisal Report of a Single-Family Residence, U.S. Appraisal, Sep. 15, 1982, 16 pages.
Sample HomeSmart Value Report, [online], Retrieved from the Internet via the Wayback Machine dated Dec. 10, 2005 on Jun. 19, 2013, URL: http://homesmartreports.com/samples/samplevaluation.htm, 4 pages.
Sample Residential Appraisal Report, U.S.Appraisal, Jul. 16, 1982, 2 pages.
Second Office Action in Chinese Patent Application No. 200710306194.8, mailing date Apr. 1, 2010, 9 pages, english translation.
Simons, R. A., "Chapter 6: Valuation of Impaired Property," When Bad Things Happen to Good Property, Throupe, R. et al., Environmental Law Institute, May 2006, 30 pages.
Software Referral Agreement with Sole Source Provision between Sperry Corporation and U.S. Appraisal, May 1985, 47 pages.
Standard & Poors, "Guidelines for the use of Automated Valuation Models for U.K. RMBS Transactions," http://www.rics.org/NR/rdonlyres/8Fcdd20c-7FAC-4549-86FB-3930CD0CBC05/0/StandardandPoorsReportonAVMs.pdf, Published Feb. 20, 2004, 4 pages.
Statsoft, Inc., "Classification Trees," http://www.statsoft.com/textbook/stclatre.html, 1984-2003 [accessed Dec. 13, 2005], pp. 1-20.
Svetnik et al., "Random Forest: A Classification and Regression Tool for Compound Classification and QSAR Modeling", J Chem Info. Computer Science, vol. 43, 2003, pp. 1947-1958.
System Operations Manual for "The Research Assistant", Evaluation Services, Inc., Feb. 12, 1997, 92 pages.
System Operations Manual, "The Research Assistant", Database Valuation Version, Evaluation Services, Inc., Feb. 12, 1997, 35 pages.
Tay et al., "Artificial Intelligence and the Mass Appraisal of Residential Apartments," Journal of Property Valuation and Investment, Feb. 1, 1992, 17 pages.
The Assessor, A Computerized Assessment System, NCR Corporation, 1986, 6 pages.
The MicroAppraisal, Certificate of Copyright Registration, Feb. 2, 1984, 2 pages.
The Tim. Top 30 Cities: Price to Rent & Price to Income Ratios (2011). Seattle Bubble, Mar. 29, 2013, 14 pages.
Transcript of Deposition of R. A. Borst, Ph. D., Case IPR2013-00034 (JL), Transcribed Sep. 19, 2013, 177 pages.
Transcript of Proceedings in Case No. C 11-06637 RS, Jan. 24, 2013, 24 pages.
Trulia.com. Trulia's rent vs. buy index reveals top 10 cities for renting, owning homes. Oct. 2010, pp. 1-4.
Turner, J., "Ad Slotting and Pricing: New Media Planning Models for New Media," Carnegie Mellon University, Apr. 23, 2010, 132 pages.
U.S. Appraisal Business Plan, dated at least since Aug. 1, 1985, 30 pages.
U.S. Appraisal Offering Memorandum, Sep. 12, 1984, 66 pages.
US. Appraisal Profit and Loss Proforma, dated at least since Aug. 1, 1985, 38 pages.
Valuation Reports, Schedule A, U.S. Appraisal, dated at least by Nov. 1, 1986, 6 pages.
Valuations, Claims Cross Engines, Inman News Features, Dec. 10, 2002, 1 page.
ValuePoint4 Report; File No. 04040103629, Apr. 12, 2004, 3 pages.
Vapnik et al., "Support-Vector Networks," Machine Learning, vol. 20, 1995, 25 pages.
Venables, W. N. et al., Modern Applied Statistics with S, New York: Springer, 2002, 495 pages. Book to be mailed to USPTO.
VeroValue screen capture, dated at least by Sep. 30, 2004, 1 page.
Visa, "Card-Not-Present Security—A Multi Layered Approach to Payment Card Security," <www.tdcanadatrust.com>, 2006, 17 pages.
Visual PAMSPro 2000, [online], Retrieved from the Internet via the Wayback Machine dated Mar. 4, 2001 on Jun. 19, 2013, URL: http://www.visualpamspro.com/prod01.htm, 2 pages.
Visual PAMSPro Custom Add Ins, [online], Retrieved from the Internet via the Wayback Machine dated Mar. 5, 2001 on Jun. 19, 2013, URL: http://www.visualpamspro.com/serv04.htm, 2 pages.
Visual PAMSPro Downloads, [online], Retrieved from the Internet via the Wayback Machine dated Mar. 2, 2001 on Jun. 19, 2013, URL: http://www.visualpamspro.com/download.htm, 1 page.
Visual PAMSPro Home, [online], Retrieved from the Internet via the Wayback Machine dated Mar. 2, 2001 on Jun. 19, 2013, URL: http://www.visualpamspro.com/, 1 page.
Visual PAMSPro News, [online], Retrieved from the Internet via the Wayback Machine dated Mar. 2, 2001 on Jun. 19, 2013, URL: http://www.visualpamspro.com/news.htm, 2 pages.
Visual PAMSPro Products, [online], Retrieved from the Internet via the Wayback Machine dated Mar. 2, 2001 on Jun. 19, 2013, URL: http://www.visualpamspro.com/products.htm, 1 page.
Visual PAMSPro Real Estate Appraisal Software, Appraisal Software Real Estate, [online], Retrieved from the Internet via the Wayback Machine dated Sep. 2, 2001 on Jun. 19, 2013, URL: http://www.visualpamspro.com/prodvpp2.htm, 6 pages.
Visual PAMSPro Tips and Tricks, [online], Retrieved from the Internet via the Wayback Machine dated Mar. 2, 2001 on Jun. 19, 2013, URL: http://www.visualpamspro.com/Tips-Tricks.htm, 1 page.
Wen, H.Z . . . Et al., "An improved method of real estate evaluation based on Hedonic price model," IEEE International Engineering Management Conference, 2004.
Wikipedia, Expectation-maximization Algorithm, [online] Retrieved from the Internet via the Wayback Machine dated Dec. 21, 2013 on Feb. 28, 2014, URL: http://en.wikipedia.org/wiki/Expectation%E2%80%93maximization_algorithm, 13 pages.
Wikipedia, Survival Analysis, <http://en.wikipedia.org/wiki/Survival_analysis> Oct. 16, 2011, Archived by Internet Wayback Machine <http://web.archive.org/web/20111016061152/http:/!en.wikipedia.org/wiki/Survival_analysis>, viewed Aug. 28, 2015, pp. 1-5.
Wilkowski, W. et al., "Application of Artificial Neural Networks for Real Estate Valuation." Shaping the Change XXIII Fig Congress, Munich, Germany, Oct. 8-13, 2006, 12 pages.
Zillow.com, Quarterly Report 2Q 2006, A Review of the San Francisco Real Estate Market.
Zurowski, B, "Essays in Social and Behavioral Economics," Retrieved from the University of Minnesota Digital Conservancy, http://hdl.handle.net/11299/175495, 2015.

\* cited by examiner home improvements & home sales table — 600

| ID | Address | Home Improvements | | | | Estimated Valuation | Actual Sale Price | Difference ($) | Difference (%) |
|---|---|---|---|---|---|---|---|---|---|
| | | A | B | C | D | | | | |
| 1 | 1611 Coleman Drive 23189 | L | -- | -- | -- | $100,000 | $110,000 | $10,000 | 10% |
| 2 | 252 Zelkova Road 23185 | M | L | -- | -- | $150,000 | $160,000 | $10,000 | 6.7% |
| 3 | 4521 Hilltop Drive 23698 | -- | -- | L | -- | $200,000 | $190,000 | ($10,000) | -5% |
| 4 | 574 New England Tpk 23758 | H | -- | -- | H | $300,000 | $320,000 | $20,000 | 6.7% |
| 5 | 1433 Green River Rd SW 23752 | -- | -- | -- | -- | $250,000 | $255,000 | $5,000 | 2% |

*FIG. 6*

21505 SE 2nd St, Sammamish, WA 98074

ZESTIMATE™: $455,899 (What's this?)

Value Range: $250,744 – $752,233

Zestimate™ with high-end kitchen remodel: $482,314

Refine value of this home    Map comparable homes

*FIG. 10*

DETERMINE REGIONAL RATE OF RETURN ON HOME IMPROVEMENTS

CROSS-REFERENCE TO RELATED APPLICATION(S)

This application is a continuation of U.S. patent application Ser. No. 14/721,437, filed on May 26, 2015, titled "DETERMINE REGIONAL RATE OF RETURN ON HOME IMPROVEMENTS," which claims the benefit of U.S. Provisional Application No. 62/059,048, filed on Oct. 2, 2014, titled "DETERMINE REGIONAL RATE OF RETURN ON HOME IMPROVEMENTS," both of which are hereby incorporated by reference in their entireties. This application is related to U.S. patent application Ser. No. 13/417,804, filed on Mar. 12, 2012 (now U.S. Pat. No. 9,605,704), entitled "AUTOMATICALLY DETERMINING A CURRENT VALUE FOR A HOME," which is hereby incorporated by reference in its entirety.

BACKGROUND

Home improvements allow homeowners to invest in, gain familiarity with, and personalize their homes. Common home improvements range in size from small upgrades (e.g., new appliances, fixtures, or paint) to extensive remodeling and renovation projects and even additions to the footprint of a home. Some home improvement projects are intended to increase the longevity of the home, e.g., roof replacement, foundation repairs, or replumbing old pipes; some are to improve safety or efficiency, e.g., adding a security system, bringing an electrical system up to current code, or installing insulated windows; and some are to improve comfort and modernize the home, e.g., installing central air conditioning, remodeling or expanding a kitchen or bathroom, and turning unfinished areas into finished living spaces. Home improvements may serve multiple purposes (e.g., exterior landscaping to add visibility for security, improve drainage, and enhance curb appeal).

Depending on the extent and complexity of the home improvements, the available time and skills of the homeowner, the homeowner's budget, and the local costs of labor and of the chosen materials for various projects, among other factors, a homeowner may choose to do home improvements on a do-it-yourself ("D-I-Y") basis, hire a contractor, or have a general contractor manage subcontractors to perform the work.

BRIEF DESCRIPTION OF THE DRAWINGS

FIG. 6 is a table diagram showing sample contents of a table containing home improvement information as well as estimated home valuations and home sale prices.

FIG. 10 is a display diagram showing a way in which information about an individual home including a home improvement rate of return generated by the facility may be presented.

DETAILED DESCRIPTION

Overview

Figure 1A:
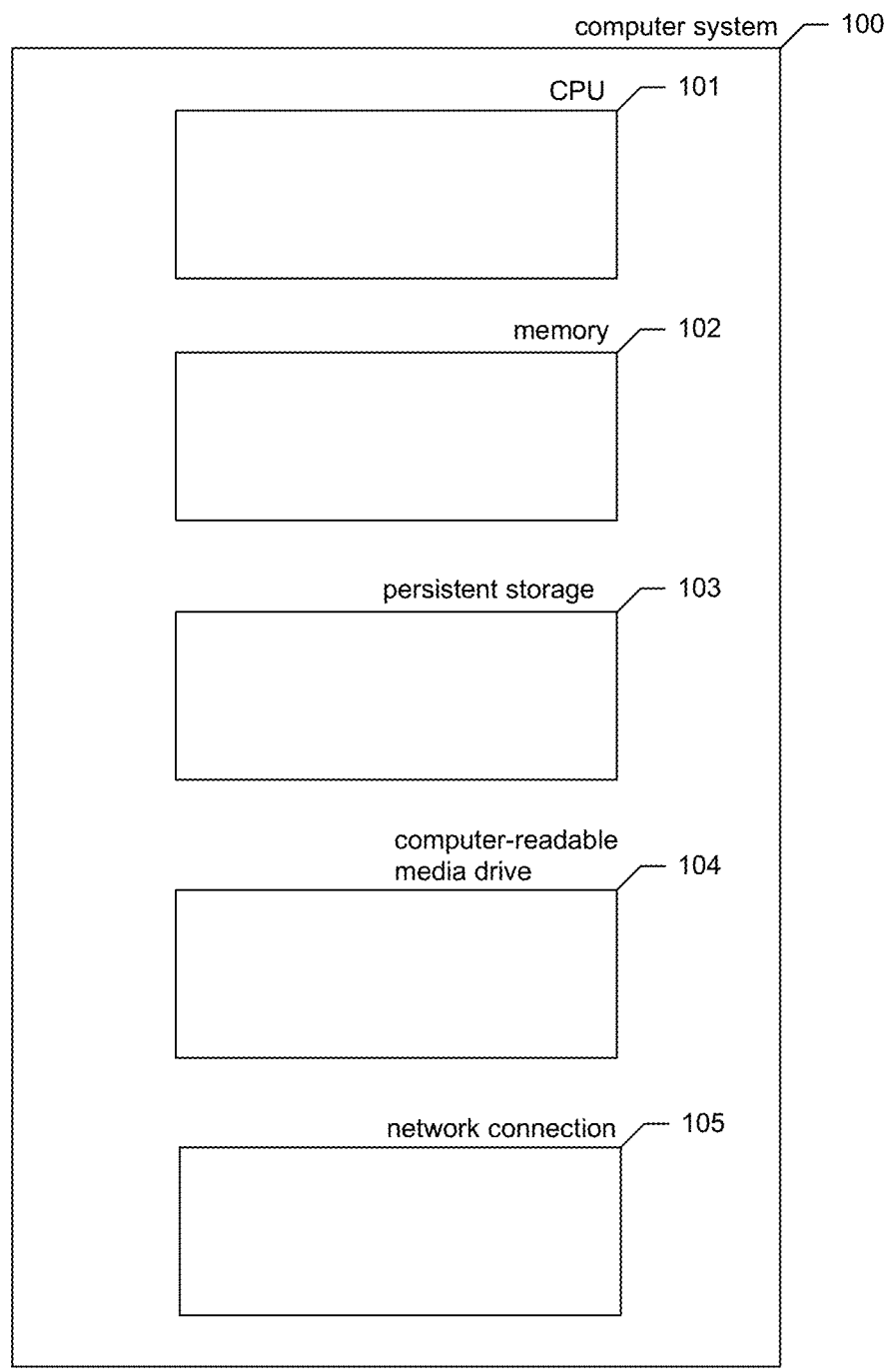
FIG. 1A is a block diagram showing some of the components typically incorporated in at least some of the computer systems and other devices on which the facility executes.

In many roles, it can be useful to be able to accurately predict the value of homes, including the value of home improvements. As examples, when they possess accurate values for homes: homeowners can correctly gauge the effects of potential home improvement projects; taxing bodies can equitably set property tax levels; sellers and their agents can optimally set listing prices; buyers and their agents can determine appropriate offer amounts; insurance firms can properly value the assets they insure; and mortgage companies can properly determine the value of the assets securing their loans.

A variety of conventional approaches exist for valuing homes. A first is, for a house that was very recently sold, attributing its selling price as its value.

Another widely-used conventional approach to valuing houses is appraisal, where a professional appraiser determines a value for a house by comparing some of its attributes to the attributes of similar nearby homes that have recently sold ("comps"). The appraiser arrives at an appraised value by subjectively adjusting the sale prices of the comps to reflect differences between the attributes of the comps and the attributes of the house being appraised.

The inventors have recognized that the conventional approaches to valuing houses have significant disadvantages in the context of home improvements. For instance, attributing the most recent sale price of a home as its value has the disadvantage that the home's value can quickly diverge from its sale price, especially in cases where home improvements are made by the new owner after the sale transaction. Even in cases where a sale price reflects some home improvements, the value of those improvements may change over time (for example, new carpets may wear out quickly, and a built-in entertainment center may go out of fashion or become technologically outdated faster than the home). Accordingly, at any given time, only a small percentage of houses, and few if any houses that have had home improvements since the sale date, can be accurately valued using the sale price approach.

The conventional manual appraisal approach, in turn, has the disadvantage that its accuracy can be adversely affected by its subjectivity. Also, an appraisal can be expensive, can take days or weeks to complete, and often requires physical access to the house by the appraiser.

In view of the shortcomings of conventional approaches to valuing homes discussed above, especially in the context of home improvements, the inventors have recognized that a new approach to valuing homes with home improvements that was more universally accurate, less expensive, and more convenient would have significant utility.

A software and/or hardware facility for automatically determining the value of a home incorporating home improvements and/or a rate of return of one or more home improvements ("the facility") is described. Though the following discussion generally employs the words "home," "house," and "housing" to refer to the property being valued, those skilled in the art will appreciate that the facility may be straightforwardly applied to properties of other types. As used herein, the term "rate of return" of a home improvement includes a dollar value of the improvement, a percentage of the improvement's cost, or a percentage of the home's actual or estimated value.

Home improvements often increase the value of a home, although many home improvements cost more than they add to the home's value. A return on a home improvement is generally defined as the portion of the cost of the improvement that could be recouped by the homeowner through increased resale value. While this percentage is often between 0 and 100%, in some cases it may be negative (i.e., the improvement lowers the resale value) or greater than 100% (i.e., the improvement raises the resale value by more than its cost). An improvement's cost and added value may each vary according to factors including, e.g., the geographic area in which the home is located (including factors from broad regional to local neighborhood effects), the size of the home, the age of the home, the value of the home excluding the home improvements, the value of the home relative to homes nearby, the type of the home improvement, how prevalent similar improvements are in other homes in the geographic area, the quality of the improvement, the age of the improvement, whether the improvement is made by a homeowner or a professional, the state of the home improvement market, and the state of the housing market.

Attempts in the remodeling industry to estimate returns on various home improvements have generally involved hypothetical projects, generic project cost estimates rather than actual cost figures, and subjective estimates of the perceived value of theoretical home improvements rather than actual valuations of homes with home improvements.

In some embodiments, the facility identifies homes on which actual home improvements have been performed by soliciting home improvement information from homeowners or others with knowledge about the home improvements. In some embodiments, the facility obtains information about actual home improvements from, e.g., contractors, neighbors, real estate agents, assessors, homeowners' associations, tax records, or development permitting authorities. Such information includes, e.g., the type of improvement, an assessment of the quality of the improvement (e.g., high-end or low-end), costs of labor and/or materials involved in the home improvement, and the date when the improvement was made. Obtained information may not include cost data, e.g., because homeowners may not wish to provide that information for a particular improvement. In some embodiments, the facility infers cost bands or ranges from quality descriptors, quality band ratings, photographs, or other quality indicators (e.g., describing high-end or low-end materials for a particular improvement) where actual cost data is not available.

In some embodiments, the facility uses a statistical model (e.g., a hedonic model) to estimate the value of a home based upon its attributes, not including home improvement information. Examples of such models are described in related U.S. patent application Ser. No. 13/417,804, filed Mar. 12, 2012, entitled "Automatically Determining a Current Value for a Home," which is hereby incorporated by reference in its entirety. When a home is sold, the facility performs a residual analysis, comparing the selling price of the home to the value estimated for the home by the statistical model not incorporating home improvement information. Where the selling price exceeds that value estimate, the facility attributes at least a portion of the surplus value to the home improvement.

In some embodiments, the facility performs a first regression analysis (e.g., using ordinary least squares (OLS)) to find the best fit between home attribute values and actual sale prices, and performs a second regression analysis on the residuals to determine the effects of home improvements. Error in the second regression analysis indicates differences between the estimated value and actual sale price attributable to factors other than home improvements.

In some embodiments, the facility predicts a sale price for a home by a theoretical regression approach (e.g., a linear regression analysis). For example, the facility may estimate the sale price P of a home as a function of a polynomial or vector in which $P \sim f(\beta X)$, where $\beta X$ represents $b_0 + b_1 X_1 + b_2 X_2$ and so forth (without necessarily being linear) in which the variables or vector components making up X include, e.g., prior sale information, the home's location, home attribute values, and home improvement data including the type, quality, and date of each improvement; and in which each variable or vector component $X_n$ has a coefficient weight $b_n$.

The facility utilizes data from past home sales with and without various types of home improvements to determine a weight for each coefficient. In some embodiments, the facility utilizes synthetic home sales data, such as, for homes listed for sale, sales prices estimated based on their listing prices and home attributes. Examples of synthetic sales are described in related U.S. patent application Ser. No. 13/828,680, filed Mar. 14, 2013, entitled "Listing Price-Based Home Valuation Models," which is incorporated herein in its entirety by reference. The facility can use synthetic sales data either together with or instead of data identifying sold homes and their selling prices. The facility may perform simulations with and without various attributes or improvements to estimate the effect of each improvement on the sale price, in terms of dollars or percentages. Because the value of a home improvement may be related to the value of the home to which the home improvement is made, the facility may estimate the value of various types of home improvements in percentage terms. For example, the facility subtracts a non-home improvement home value estimate Z from the actual selling price P that reflects home improvement information, and divides the difference by Z. (In some embodiments, the difference is instead divided by P.) The result is the estimated percentage effect of the home improvements on the value of the home.

In some embodiments, the facility estimates a rate of return on one or more home improvements based on repeat home sales, where at least one home improvement was performed between two sales of a home. For example, a home may be sold to a developer or remodeler who performs various home improvements and then quickly "flips" the home. The value of the home improvements are thus reflected in the later sale price and not the earlier sale price. A homeowner may also perform a home improvement over a longer course of ownership between buying and selling the home, during which the home improvement's value may have depreciated or the home's value independent of the home improvement may have changed significantly. The facility determines the effects of home improvements on home value by accounting for market fluctuations or other expected value changes between the sale dates and attributing remaining differences to the value of each home improvement performed on the home.

In some embodiments, the facility determines the estimated contribution of each home improvement to an overall estimated effect of home improvements based on the information about each home improvement and a decay factor regarding the time since each improvement, which has the effect of attributing greater impact to more recent improvements. In some embodiments, the effect of home improvements is constrained to be non-negative, such that a home improvement will not decrease the value of a home.

In some embodiments, the facility determines one or more rates of return based on the dollar value (or estimated value) or a quality rating (e.g., high-, medium-, or low-end) of one or more home improvements rather than the binary presence or absence of particular home improvements. In some embodiments, the facility performs a regression on a continuous interval or value such as (0 . . . 1) or (0 . . . x).

In some embodiments, the facility determines a rate of return on a home improvement by dividing the attributed portion of a home value surplus by the cost of the improvement. The facility aggregates individual rates of return across each type of home improvement for improvements in a geographic area, e.g., on a per-region basis.

In some embodiments, the facility estimates returns on various home improvements for each of a number of geographic areas. In some embodiments, the facility estimates home improvement returns by ZIP code or by geographic regions of other types. For example, insofar as home improvements of different types tend to be associated with different tiers of housing stock, e.g., an added swimming pool for larger and more expensive homes, the facility in some embodiments determines a rate of return on a type of improvement for such homes within a ZIP code or other region. In some embodiments, the facility applies spatial smoothing across ZIP codes or other geographic boundaries. For example, calculating a return on a kitchen remodel may include combining, e.g., a local ZIP code kitchen remodel rate of return and a county-wide kitchen remodel rate of return, with each rate of return weighted as a function of the number of kitchen remodels having occurred within the ZIP code and the county over some time period. In some embodiments, the facility calculates a rate of return on a home improvement by combining a local home improvement rate of return with one or more home improvement rates of return in immediately bordering or nearby areas without regard to higher-order regions (e.g., city limits, counties, legislative districts, states, etc.) that may or may not encompass those areas.

In some embodiments, the facility establishes, for each of a number of geographic regions, a model of housing prices reflecting the effects of home improvements in that region. The model transforms inputs corresponding to home attributes, including home improvement information, into an output constituting a predicted value of a home having those attributes in the corresponding geographic area. To determine the value of a particular home after particular home improvements are made (and thus estimate the value of the particular home improvements for that home), the facility selects the model for a geographic region containing the home and subjects the home's attributes, including actual or prospective home improvement information, to the selected model.

In some embodiments, the facility regularly applies the approaches described herein to the attributes of a large percentage of homes having home improvements in a geographic area to compute and convey a value and/or an average return on various types of home improvements for the homes in that area or for a subset of homes. In some embodiments, the facility periodically determines average returns on home improvements for the homes in a geographic area, and uses them as a basis for storing and conveying a regional rate of return for each of a plurality of types of home improvements.

The approach employed by the facility can be used to value, with greater accuracy, virtually any home having or contemplating home improvements whose attributes are known or can be determined. Further, because this approach does not require the services of a professional appraiser, it can typically determine a home's value accounting for the effects of home improvements quickly and inexpensively, in a manner generally free from subjective bias. In addition, this approach can help a homeowner to decide whether a particular home improvement is worthwhile to perform.

DESCRIPTION OF FIGURES

FIG. 1A is a block diagram showing some of the components typically incorporated in at least some of the computer systems and other devices on which the facility executes. These computer systems and devices 100 may include one or more central processing units ("CPUs") 101 for executing computer programs; a computer memory 102 for storing programs and data-including data structures, database tables, other data tables, etc.—while they are being used; a persistent storage device 103, such as a hard drive, for persistently storing programs and data; a computer-readable media drive 104, such as a CD-ROM drive, for reading programs and data stored on a computer-readable medium; and a network connection 105 for connecting the computer system to other computer systems, such as via the Internet, to exchange programs and/or data—including data structures. The terms "memory" and "computer-readable storage medium" include any combination of temporary and/or permanent storage, e.g., read-only memory (ROM) and writable memory (e.g., random access memory or RAM), writable non-volatile memory such as flash memory, hard drives, removable media, magnetically or optically readable discs, nanotechnology memory, biological memory, and so forth, but do not include a propagating signal per se. In various embodiments, the facility can be accessed by any suitable user interface including Web services calls to suitable APIs. While computer systems configured as described above are typically used to support the operation of the facility, one of ordinary skill in the art will appreciate that the facility may be implemented using devices of various types and configurations, and having various components.

Figure 1B:
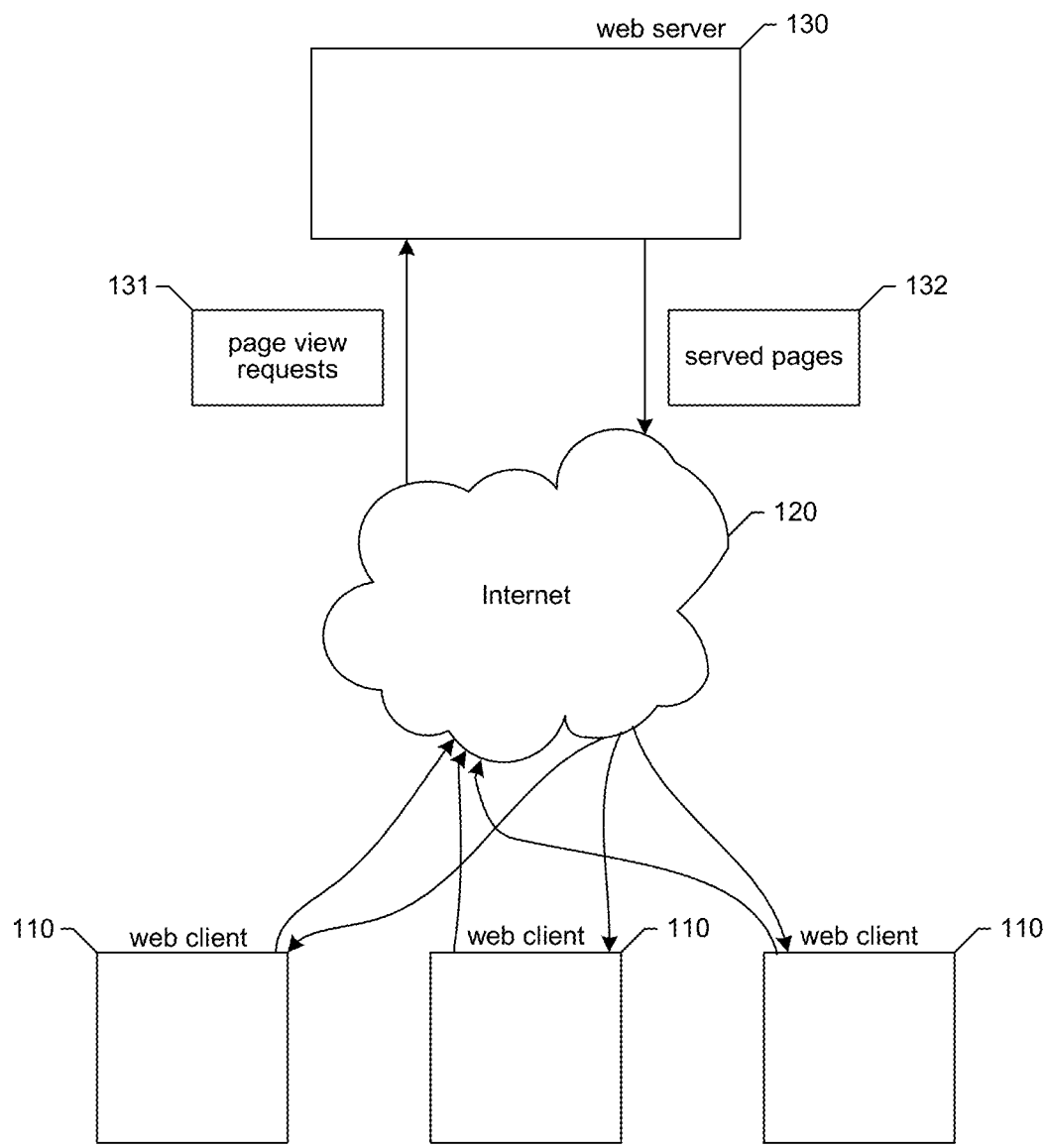
FIG. 1B is a high-level data flow diagram showing data flow in a typical arrangement of components used to provide the facility.

FIG. 1B is a high-level data flow diagram showing data flow in a typical arrangement of components used to provide the facility. A number of web client computer systems 110 that are under user control generate and send page view requests 131 to one or more logical web servers 130 via a network such as the Internet 120, such as page requests for pages that include home improvement rates of return generated by the facility. Within the web server, these requests may either all be routed to a single web server computer system, or may be load-balanced among a number of web server computer systems. The web server typically replies to each with a served page 132. Web servers 130 may include computing nodes used to determine home improvement rates of return, or such computing nodes may be remote from the web servers and simply make home improvement rates of return determined by the facility available to the web servers.

While various embodiments are described in terms of the environment described above, those skilled in the art will appreciate that the facility may be implemented in a variety of other environments including a single, monolithic computer system, as well as various other combinations of computer systems or similar devices connected in various ways including cloud computing resources. In various embodiments, a variety of computing systems or other different client devices may be used in place of the web client computer systems, such as mobile phones, personal digital assistants, televisions and associated video sources, cameras, tablet computer systems, laptop computer systems, desktop computer systems, etc.

Figure 2:
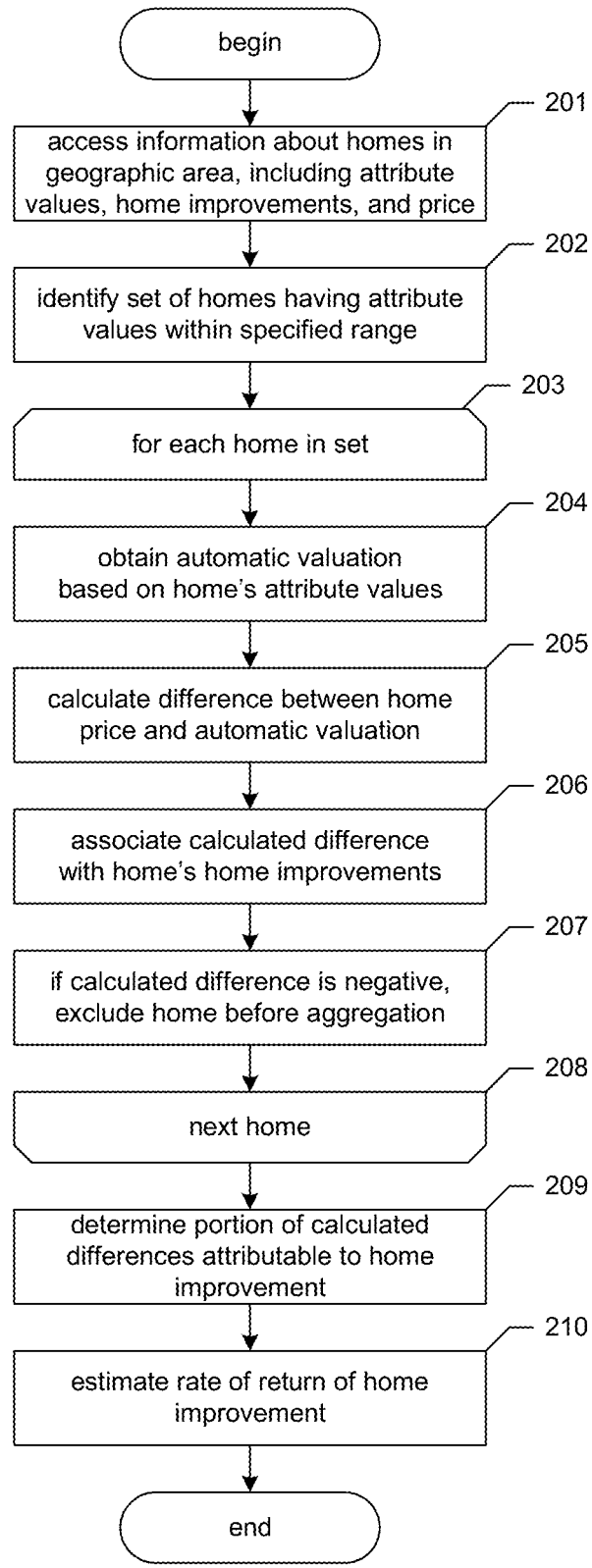
FIG. 2 is a flow diagram showing steps typically performed by the facility in some embodiments to estimate a rate of return of home improvements for homes in a geographic area using automatic valuations.

FIG. 2 is a flow diagram showing steps typically performed by the facility in some embodiments to estimate a rate of return of home improvements for homes in a geographic area using automatic valuations. In various embodiments, the facility performs these steps for one or more geographic areas of one or more different granularities, including ZIP code, neighborhood, city, county, state, country, etc. In some embodiments these steps are performed periodically for each geographic area, such as daily. In step 201, the facility accesses information about homes in the geographic area. The information includes, for example, for each home for which the information is available, values of attributes of the home, data describing home improvements performed on the home, a price associated with the home, and information about whether the price reflects the home improvements performed on the home (e.g., information that a home improvement was performed before a sale price date). In some embodiments, the facility ignores or imputes missing values. In some embodiments, the facility categorizes home improvements by type, cost, quality, age, location, and/or other criteria. The facility may obtain home improvement information by soliciting information from home owners, contractors, or others with relevant knowledge of the improvements (e.g., inviting home owners to check boxes on a form listing possible improvement types, qualities, and/or dates). In some embodiments, the facility applies a depreciation factor to reported home improvement costs based on, e.g., the age of the improvement. The facility may obtain price information (including, e.g., sale prices, listing prices, or synthetic sale prices) using, e.g., listing and sales data from a variety of public or private sources. In some embodiments, some of the prices are associated with homes having a home improvement of a particular type, and some of the prices are associated with homes not having a home improvement of the particular type. An example of data regarding home improvements and prices is the table shown in FIG. 6. In some embodiments, the facility filters the accessed information to exclude data such as outlier values and unreliable information, e.g., by ignoring a questionable value or excluding a home associated with undependable data. In step 202, the facility identifies a set of homes having attribute values within a specified range. For example, the facility may identify homes of a certain size, age, or value, or use other criteria: e.g., two-bedroom homes of at least 1,000 square feet built since 1945 with a lot size over 4,800 square feet on a residential street.

The facility carries out steps 203-208 for each home in the set of homes for which information is accessed. In step 204, the facility obtains an automatic valuation of the home based on the home's attribute values. For example, the facility may obtain an automatic valuation that excludes information about home improvements performed on the home. In step 205, the facility calculates a difference between the obtained automatic valuation of the home and the price associated with the home. For example, the facility may calculate a difference between, on the one hand, a price associated with a home having various home improvements and, on the other hand, an automatic valuation not reflecting one or more of the home improvements. In step 206, the facility associates the calculated difference with the data describing home improvements performed on the home. In step 207, in some embodiments, if the calculated difference is negative, e.g., if the price associated with a home having home improvements is less than the automatic valuation for the home not reflecting the home improvements, then facility excludes the home before aggregating its data with the other homes in the set. For example, the facility may remove data about the home from the set, mark its data to be filtered or skipped, or exclude the home from information about homes having particular home improvements. In step 208, the facility proceeds to the next home in the set.

In step 209, the facility determines a portion of the calculated differences attributable to home improvements, e.g., a portion of the calculated differences attributable to a home improvement of a particular type. In some embodiments, the facility aggregates and analyzes the calculated differences and the associated data describing home improvements performed on the homes in the set to attribute all or a portion of the differences to one or more home improvements, e.g., by theoretical regression or other modeling including home attribute data and data categorizing the home improvements. In step 210, the facility estimates, based on the determined portion of the calculated differences attributable to one or more home improvements, a rate of return of one or more home improvements for the distinguished home. For example, the facility may determine that kitchen remodels of some quality for houses of a certain size in a particular neighborhood tend to increase the home's value by a specified amount or within a range of values. After step 210, these steps conclude.

Those skilled in the art will appreciate that the steps shown in FIG. 2 and in each of the flow diagrams discussed below may be altered in a variety of ways. For example, the order of the steps may be rearranged; some steps may be performed in parallel; shown steps may be omitted, or other steps may be included; etc.

Figure 3:
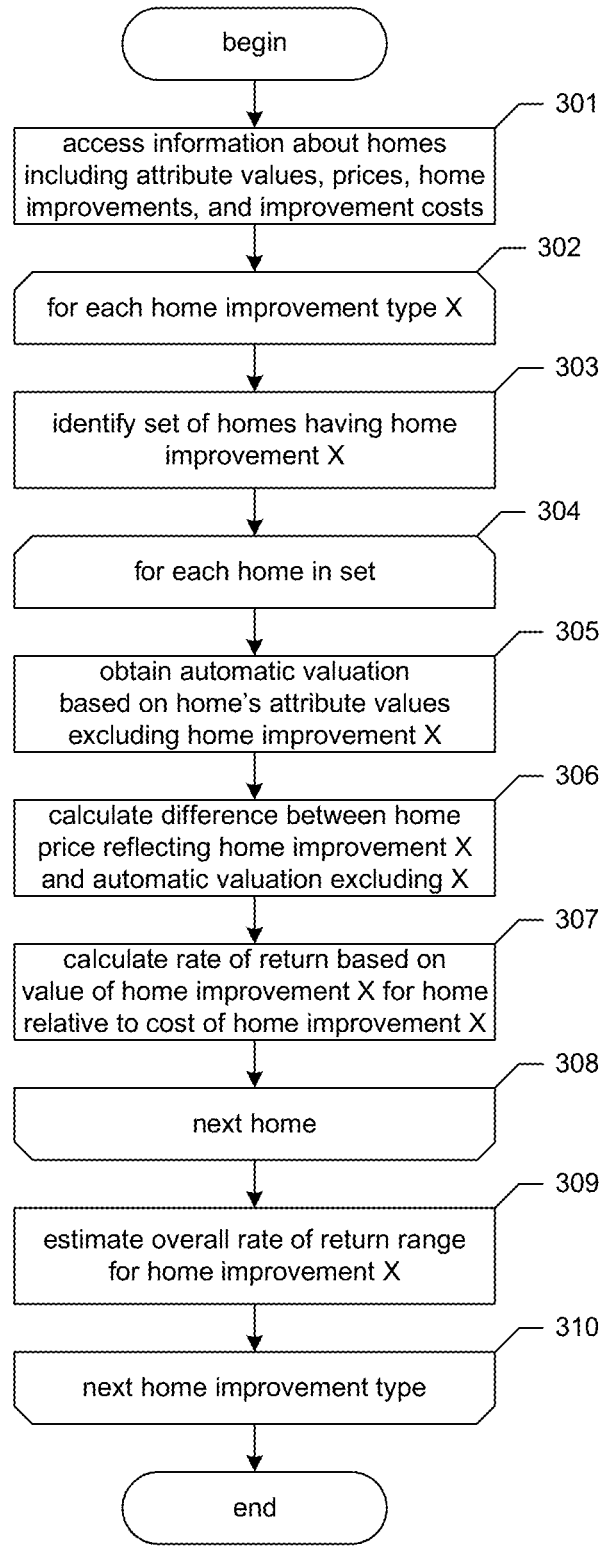
FIG. 3 is a flow diagram showing steps typically performed by the facility in some embodiments to estimate home improvement type rates of return by home improvement type using automatic valuations.

FIG. 3 is a flow diagram showing steps typically performed by the facility in some embodiments to estimate home improvement type rates of return by home improvement type using automatic valuations. In step 301, the facility accesses information about homes, e.g., homes in a geographic area. The information includes, for example, for each home for which the information is available, values of home attributes, a price associated with the home, data describing home improvements performed on the home, information about whether the price reflects the home improvements performed on the home (e.g., information that a home improvement was performed before a sale price date), and information about the costs of home improvements performed on the home (e.g., actual costs or quality band ratings provided by a home owner or another party with knowledge of the home improvements). The facility carries out steps 302-310 for each home improvement type X. For example, the facility may carry out steps 302-310 for homes improved by a new front door. In some embodiments, categorization by home improvement type includes categorization by, e.g., cost, quality, age, location, and/or other criteria. For example, the facility may carry out steps 302-310 for homes improved by a new solid wood front door. In step 303, the facility identifies a set of homes having home improvement X.

In steps 304-308, the facility iterates through each of the homes in the set of homes having home improvement X (e.g., a koi pond). In step 305, the facility obtains an automatic valuation of the home based on the home's attribute values excluding home improvement X (e.g., a model not provided information about home improvement X, or a model in which consideration of home improvement X is switched off). For example, the facility may estimate the value of the home ignoring any information about the home's koi pond. In step 306, the facility calculates a difference or ratio between the automatic valuation of the home excluding home improvement X and a price associated with the home reflecting home improvement X (e.g., a sale or listing price of the home having a koi pond). In step 307, the facility calculates a rate of return for home improvement X based on the value of home improvement X for the home (based on, e.g., the calculated difference or ratio between the automatic valuation and the price associated with the home) relative to the cost of home improvement X for the home. For example, attributing the calculated difference between a valuation and a sale price of a particular home to a koi pond as a simple illustration, one calculated rate of return would be the value difference divided by the cost of the koi pond improvement, expressed, e.g., as a percentage of the cost of the improvement. In some embodiments, the rate of return is constrained to be positive or non-negative, e.g., by filtering out negative rates of return before aggregation with data from other homes. In step 308, the facility proceeds to the next home in the set.

In step 309, the facility estimates an overall rate of return or an overall range of rates of return for home improvement X. In some embodiments, the facility aggregates the calculated rates of return for each home in the set of homes having home improvement X (e.g., using an arithmetic mean or median value or a statistical analysis with confidence intervals). In some embodiments, the facility performs an analysis of the rate of return of home improvement X in relation to other home improvements performed on the homes in the set, e.g., via multiple regression or simulations with various permutations of home improvements included or excluded (e.g., Monte Carlo simulations) to determine the effect of each improvement. For example, the facility may estimate that the rate of return for adding a koi pond to a home of a certain size and age in a specific neighborhood is some percentage of its cost. In various embodiments, the facility performs these steps for one or more geographic areas of one or more different granularities, including ZIP code, neighborhood, city, county, state, country, etc. In some embodiments these steps are performed periodically for each geographic area, such as weekly. In step 310, the facility proceeds to the next home improvement type. After all home improvement types have been processed, these steps conclude.

Figure 4:
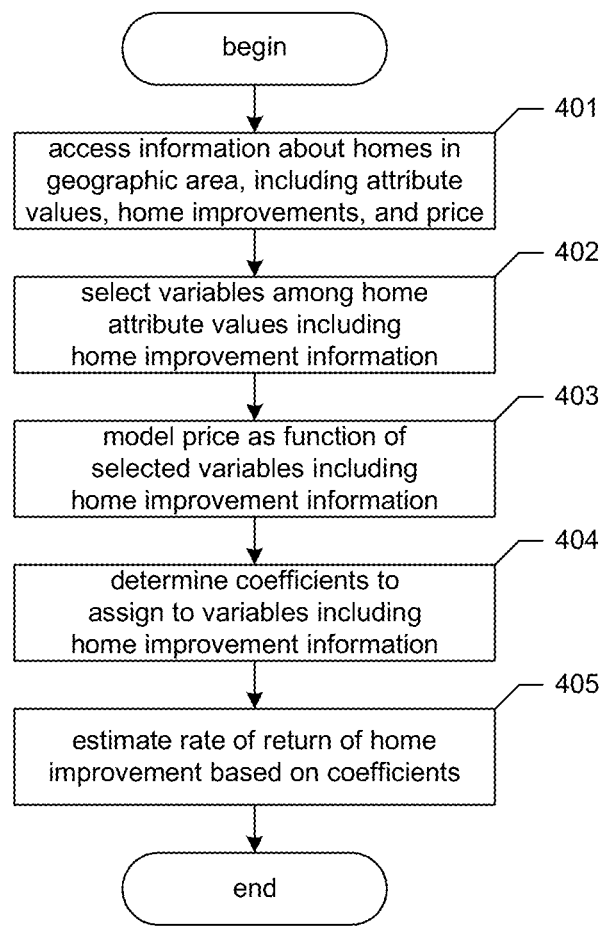
FIG. 4 is a flow diagram showing steps typically performed by the facility in some embodiments to estimate home improvement rates of return using a regression model.

FIG. 4 is a flow diagram showing steps typically performed by the facility in some embodiments to estimate home improvement rates of return using a regression model. In step 401, the facility accesses information about homes, e.g., homes in a geographic area. The information includes, for example, for each home for which the information is available, values of home attributes, a price associated with the home, data describing home improvements performed on the home, information about when each home improvement was performed (e.g., how long before a following sale price date), and information about the costs of home improvements performed on the home (e.g., actual, approximate, or estimated costs or quality band ratings provided by a home owner or another party with knowledge of the home improvements). In some embodiments, the facility solicits home improvement information from homeowners or others with knowledge about the home improvements and using the obtained information identifies homes on which home improvements have been performed and determines details of those improvements. In some embodiments, the facility obtains information about performed home improvements from, e.g., homeowners, neighbors, real estate agents, home improvement contractors, building material or appliance suppliers, homeowners' associations, development permitting authorities, assessors, or tax records. Home improvement information includes, e.g., the type of improvement, an assessment of the quality of the improvement (e.g., high-end or low-end), costs of labor and/or materials involved in the home improvement, and the date when the improvement was made.

In step 402, the facility selects variables among the accessed home attribute values including home improvements. In various embodiments, the facility treats home improvement information as independent variables along with other home attributes and home attribute values (e.g., a home's size, age, and location). In some embodiments, determining variables includes selecting a subset of available variables, e.g., to reduce complexity, avoid highly collinear variables, identify variables without significant effects, etc. For example, if home improvement information includes both estimated cost ranges and approximate quality ratings of home improvements, the effects of those independent variables may be closely correlated, and the facility may select one variable and not the other to more accurately determine the effect of the selected variable on home price. In various embodiments, the facility selects as independent variables one or more of the binary presence or absence of each of several home improvements; a quality assessment or rating band for each home improvement; a dollar cost of each performed home improvement; and an age of each home improvement (e.g., the length of time from an improvement to a following sale transaction) that functions as a home improvement depreciation factor for each home improvement type.

In step 403, the facility models the accessed price of the home as a function of the selected home attribute values. In various embodiments, the facility uses a hedonic regression model or other statistical model to estimate the value of a home based upon the selected independent variable home attributes including home improvement information. In some embodiments, the facility employs a linear or non-linear regression analysis, e.g., multiple regression, to estimate the dependent variable sale price P of a home (or a change in sale price P, e.g., a difference between P and a previous price or an estimated valuation) as a function of a polynomial equation or vector in which P~f($\beta$X), where $\beta$X represents parameters $b_0+b_1X_1+b_2X_2$ and so forth. The independent variables or vector components making up X include the selected home attribute value variables including, e.g., home improvement data such as the type, quality, cost, and/or date of each improvement. The equation need not be linear; it may include, e.g., higher-order elements or other non-linear factors.

Each independent variable or vector component $X_n$ has a coefficient weight $b_n$ representing the effect of the associated variable $X_n$ on the dependent variable, home sale price P, holding other factors constant. In step 404, the facility determines a weight for each selected variable's coefficient based on the application of the statistical model to the accessed information. In some embodiments, the facility performs a series of regression analyses using different selected variables to determine, e.g., which variables have the greatest correlation with home sale prices or with changes to sale prices (by dollars or by percentage changes in value).

In step 405, the facility estimates a rate of return of a home improvement based on one or more determined coefficients for home improvement information. Each coefficient represents, e.g., a portion of a home sale price P attributable to the improvement, holding other factors constant. In some embodiments, the facility estimates a rate of return directly from one or more coefficients relating to a particular home improvement (including, e.g., its type, cost, and/or age). For example, using a function that includes an independent variable for the cost of a bathroom upgrade, the facility can determine via the coefficient for that independent variable how much each dollar spent on a bathroom upgrade contributes to a later sale price, all else being equal. After the facility estimates a rate of return of a home improvement, these steps conclude.

Figure 5:
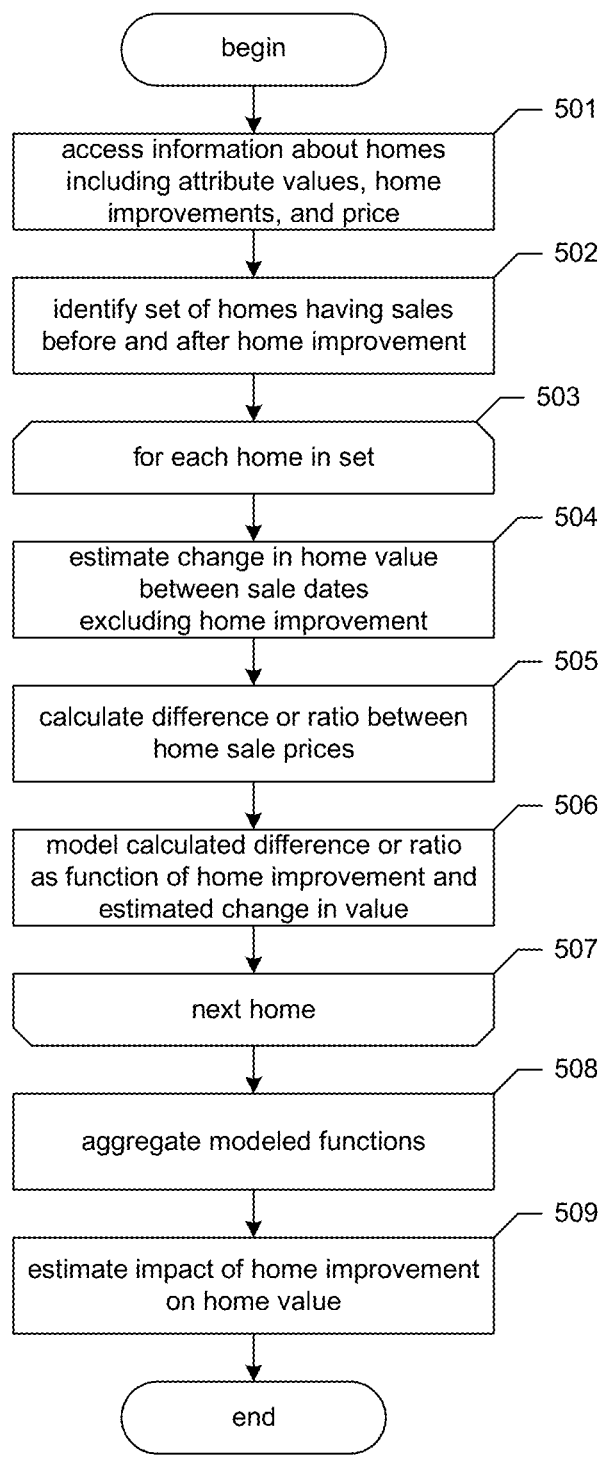
FIG. 5 is a flow diagram showing steps typically performed by the facility in some embodiments to estimate the impact of home improvements on home value based on multiple sales.

FIG. 5 is a flow diagram showing steps typically performed by the facility in some embodiments to estimate the impact of home improvements on home value based on multiple sales. In step 501, the facility accesses information about homes, e.g., similar homes in a geographic area. The information includes, for example, for each home for which the information is available, values of home attributes, a price associated with the home, data describing home improvements performed on the home, information about whether the price reflects the home improvements performed on the home (e.g., information that a home improvement was performed before a sale price date), and information about the costs of home improvements performed on the home (e.g., actual, approximate, or estimated costs or quality band ratings provided by a home owner or another party with knowledge of the home improvements). In step 502, the facility identifies a set of homes having sale prices before and after the date of a home improvement, such that the earlier sale price does not reflect the home improvement and the later price does reflect the home improvement. For example, a home may have been sold a first time in December 2013, had one or more home improvements performed in February 2014, been listed for sale in May 2014, and been sold a second time in June 2014. In some embodiments, the facility utilizes a listing price or a synthetic sale price in place of or in addition to an actual sale price.

The facility carries out steps 503-507 for each home in the set of homes having multiple sales including sales before and after one or more home improvements. In step 504, the facility estimates a change in the home's value between two sale price dates, irrespective of any home improvements performed on the home between those dates. For example, in some embodiments, the facility obtains two automatic valuations of the home, one as of the earlier sale date and another as of the later sale date, in which both of the automatic valuations exclude (or in which both include) the performed home improvements. In some embodiments, the facility obtains an automatic valuation of the home as of the later sale date that excludes home improvements performed since the earlier sale date and before the later sale date. In some embodiments, the facility obtains an automatic valuation of the home as of the earlier sale date that includes home improvements performed between the earlier and later sale dates. In some embodiments, the facility uses an estimate of percentage value changes for houses similar to the home between the sale dates, or another gauge of housing market appreciation or depreciation in the home's geographic area, and applies it to determine an expected change in value for the home between the sale dates without accounting for improvements to the home. In various embodiments, the facility expresses the estimated change in home value as a numeric difference, as a percentage difference, or as a ratio between home values.

In step 505, the facility calculates a difference between the earlier and later home sale prices, or a ratio between the earlier and later home sale prices. The calculated price difference or ratio includes, e.g., the effects of home market changes in the home's geographic area and the effects of home improvements on the value of the home. In some embodiments, the facility constrains the difference attributable to home improvements to be positive or non-negative, or constrains the ratio to be greater than or equal to one, e.g., by filtering out homes for which the difference or ratio is smaller than the estimated change in home value between the sale dates. For example, if the estimated change in home values in the home's market between the sale dates as determined in step 504 is $10,000 and the calculated difference between the earlier and later home sale prices is $5,000, the facility may exclude the home from estimating the impact of home improvements on the home's value. Or, e.g., if prices for similar houses in the home's geographic area fell 5% (a ratio of 0.95) between the sale dates but the home's price fell 10% over the same period (a ratio of 0.90), the facility may exclude the home.

In step 506, the facility models the calculated difference or ratio between the earlier and later home sale prices as a function of the estimated change in the home's value between those sale price dates and of the home improvements performed on the home between the sale price dates. In some embodiments, the function uses, as one or more independent variables describing home improvements, one or more of: the binary presence or absence of various home improvements; quality or cost rating bands or categories of home improvements (e.g., a high-end bath remodel, or a low-cost landscaping project); or dollar amounts spent on various home improvements. In various embodiments, the facility determines a function having independent variables representing the home improvements, with coefficients for each variable representing the relative impact of the associated variable.

For example, the facility may model the difference between two actual sale prices calculated in step 505 (e.g., later sale price minus earlier sale price) as a function of both the predicted change in the home's value described in step 504 (e.g., estimated valuation as of the later sale date excluding home improvements minus earlier sale price) and the cost in dollars of the home improvements known to have been performed on the home between the sale dates. In this example, a coefficient in a resulting modeled function represents the impact in dollars that each dollar spent on a given home improvement will have on the home's value.

For another example, the facility may model the ratio between two actual sale prices calculated in step 505 (e.g., later sale price divided by earlier sale price) as a function of both the estimated change in the home's value described in step 504 (e.g., estimated market appreciation of the home between the sale dates) and binary indicators of whether various home improvements are known to have been performed on the home between the sale dates. In this example, a coefficient in a resulting modeled function represents the proportional or percentage impact that performing a given home improvement will have on the home's value.

In various embodiments, the facility weights data regarding the effects of home improvements by accounting for the age of a home improvement at the time of the later sale price (e.g., applying a depreciation or discount factor for less recent improvements). For example, in modeling a function, the facility may assign a greater likelihood that a home's price was affected by a home improvement performed one month before the home's sale than by an improvement performed six years before the home's sale.

In step 507, the facility proceeds to the next home in the set. In step 508, the facility aggregates the modeled functions for the homes in the set to determine an overall function estimating the impact of various home improvements on home value in the geographic area. In some embodiments, the facility aggregates data for homes in the set and models a function estimating the impact of home improvements based on the aggregated data without necessarily modeling a function for each home in the set. In step 509, the facility determines an overall estimated impact or an overall range of estimated impacts on home value for one or more home improvements. In various embodiments, the facility estimates the impact of home improvements on the value of sets of similar homes, e.g., homes of a certain size or age, homes in a particular neighborhood, ZIP code, city, metropolitan area, legislative district, region, or other geographic area, or homes of similar value. In some embodiments these steps are performed periodically for each set of homes. After the facility estimates the impact of home improvements on home value, these steps conclude.

FIG. 6 is a table diagram showing sample contents of a table containing home improvement information as well as estimated home valuations and home sale prices. The home improvements and home sales table 600 is made up of rows 601-605, each representing a home sale that occurred in a recent period of time, such as the preceding 60 days. Each row is divided into the following columns: an identifier column 611 containing an identifier for the home or sales transaction; an address column 612 containing the address of the home; home improvement columns 613-616 containing indications of what home improvements have been performed on the home, and of their quality or cost; an estimated valuation column 617 containing a valuation of the home (e.g., an automatic valuation not reflecting the home improvements); an actual sale price column 618 containing a sale price of the home (e.g., a sale price reflecting the home improvements); a dollar value difference column 619 containing the difference in dollars between the estimated valuation in column 617 and the actual sale price in column 618; and a percentage difference column 620 containing the percentage difference between the estimated valuation in column 617 and the actual sale price in column 618.

For example, row 604 indicates that home number 4 is located at 574 New England Turnpike 23758, has a high-end home improvement A (versus, e.g., medium, low-end, or none), no home improvement B or C, and a high-end home improvement D, and has an estimated valuation of $300,000 and an actual sale price of $320,000, for a difference of $20,000 or 6.7% above the estimated valuation. For example, home improvement A may be a kitchen remodel; home improvement B may be replacing carpets with hardwood floors; home improvement C may be upgrading out-of-date electrical wiring; and home improvement D may be installing an automatic lawn sprinkler system. Though the contents of home improvements and home sales table 600 are included to present a comprehensible example, those skilled in the art will appreciate that the facility can use a home improvements and home sales table 600 having columns corresponding to different and/or a larger number of attributes, as well as a larger number of rows. The table may include additional or different home improvement data, for example, date of improvement, dollar cost of improvement, improvement level or quality relative to nearby or similar homes, whether the improvement was performed by a professional contractor or the owner, etc. The table may also include various home attributes, for example, size, numbers of bedrooms and bathrooms, year built, construction materials, cooling technology, structure type, fireplace type, parking structure, driveway, heating technology, swimming pool type, roofing material, occupancy type, home design type, view type, view quality, lot size and dimensions, number of rooms, number of stories, school district, longitude and latitude, neighborhood or subdivision, tax assessment, attic and other storage, etc. For a variety of reasons, certain values may be omitted from the home improvements and home sales table 600. In some embodiments, the facility imputes missing values using the median value in the same column for continuous variables, or the mode (i.e., most frequent) value for categorical values. In other embodiments, the imputation is a multivariate prediction based on the other non-missing attributes.

Though FIG. 6 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be indexed in ways not shown; may be compressed and/or encrypted; etc.

Figure 7:
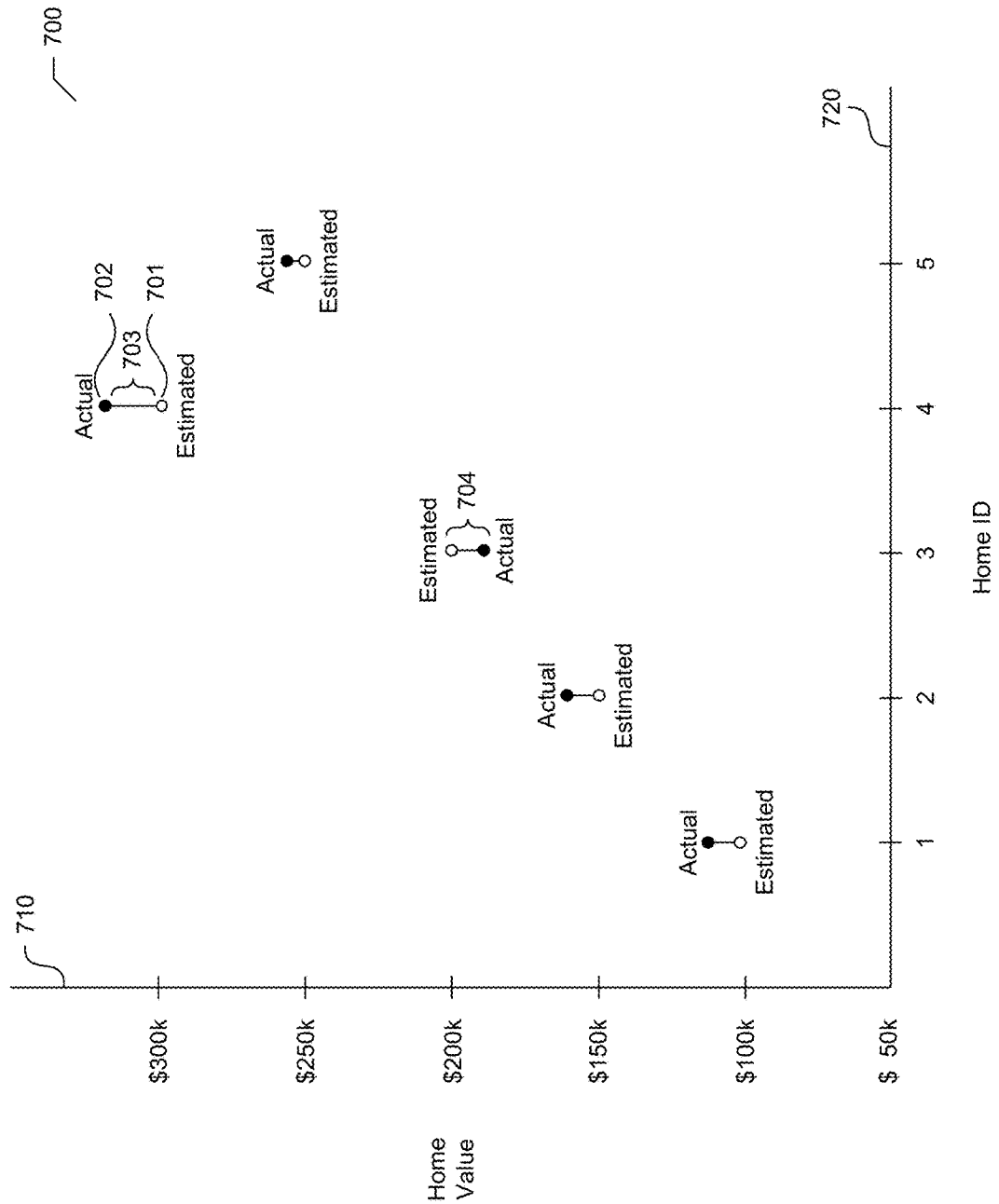
FIG. 7 is a graph showing differences between estimated and actual prices of homes having home improvements.

FIG. 7 is a graph showing differences between estimated and actual prices of homes having home improvements. The examples in graph 700 illustrate the differences between estimated valuations and actual sale prices for the homes listed in home improvements and home sales table 600 in FIG. 6. Each home ID 1-5 from table 600 column 611 (rows 601-605) is plotted along horizontal axis 720. Vertical axis 710 shows home values in dollars, with estimated valuations represented by an empty circle and actual prices represented by a solid circle. For example, for home ID 4, the estimated valuation 701 is $300,000 (corresponding to FIG. 6 row 604, column 617) and the actual sale price 702 is $320,000 (corresponding to FIG. 6 row 604, column 618). The difference is represented by a vertical line 703. The taller the line, the greater the absolute difference between the estimated valuation and actual price. In the case of home ID 3, the difference 704 between the estimated valuation and actual price is negative, illustrated by the empty estimated valuation circle above the solid actual price circle. In some embodiments, the facility excludes the difference associated with home ID 3 from calculation of a rate of return of home improvements associated with home ID 3.

Figure 8A:
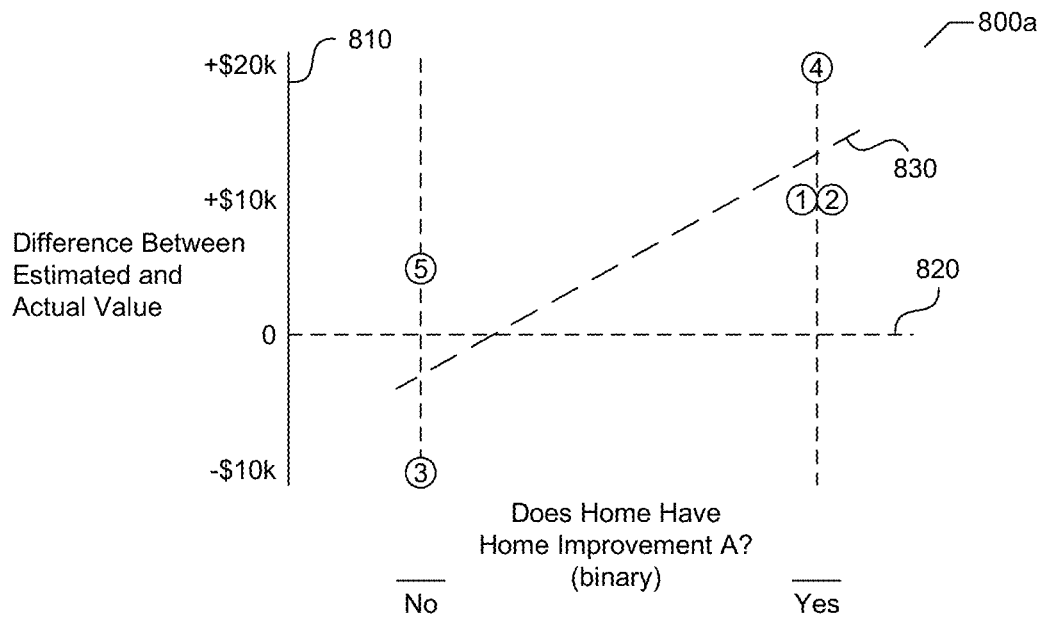
FIG. 8A is a graph showing price differences for homes not having or having a home improvement of a particular type.

FIG. 8A is a graph showing price differences for homes not having or having a home improvement of a particular type. The examples in graph 800*a* illustrate the differences between estimated valuations and actual sale prices for the homes listed in home improvements and home sales table 600 in FIG. 6, with respect to the presence or absence of home improvement A. Each difference from table 600 column 619 for home IDs 1-5 (rows 601-605) is plotted along vertical axis 810, using the home ID in a circle to identify the home. Horizontal axis 820 shows, on a binary Yes-No scale, whether the home is associated with home improvement A. For example, as shown in column 613 of table 600, home improvement A was performed on homes 1, 2, and 4, but not on homes 3 and 5. Thus, homes 1, 2, and 4 are grouped in the "Yes" category along the horizontal axis and homes 3 and 5 are grouped in the "No" category along the horizontal axis. Line 830 illustrates an example calculation of an estimated rate of return of home improvement A based on comparing the price differences possibly attributable to home improvement A versus baseline price differences not attributable to home improvement A.

Figure 8B:
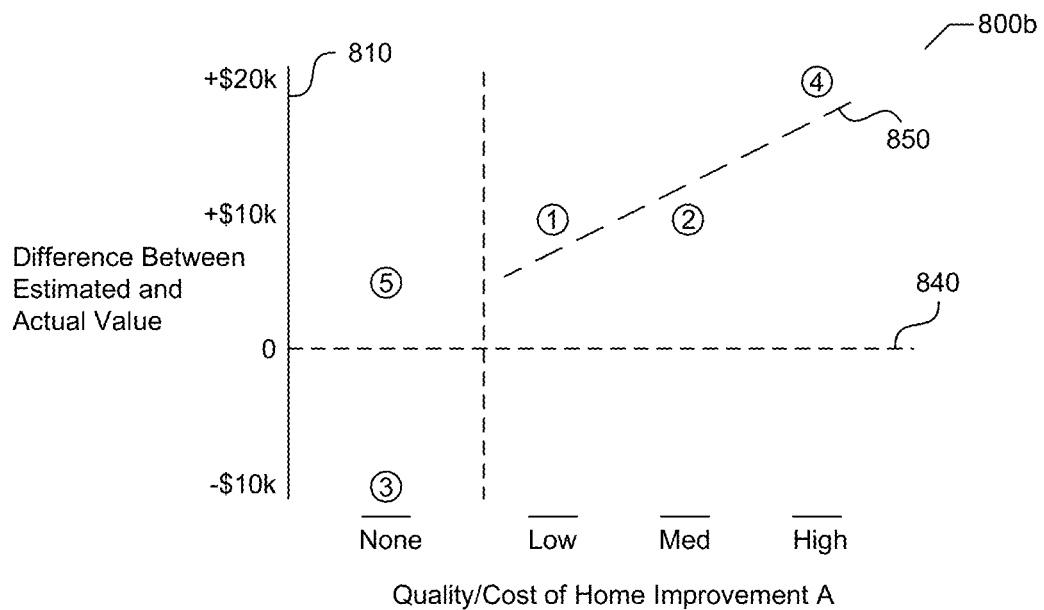
FIG. 8B is a graph showing price differences for homes not having or having a home improvement of a particular type on a low-medium-high quality or cost scale.

FIG. 8B is a graph showing price differences for homes not having or having a home improvement of a particular type on a low-medium-high quality or cost scale. Similarly to graph 800*a*, the examples in graph 800*b* illustrate the differences between estimated valuations and actual sale prices for the homes listed in home improvements and home sales table 600 in FIG. 6, but with respect to the quality or cost of home improvement A when present. As in FIG. 8A, each difference from table 600 column 619 for home IDs 1-5 (rows 601-605) is plotted along vertical axis 810, using the home ID in a circle to identify the home. In graph 800*b*, however, horizontal axis 840 shows, on a quality or cost scale, whether the home is associated with home improvement A and if so whether the home improvement is low-, medium-, or high-end. In some embodiments, the quality or cost scale 840 is finer or a continuous variable, e.g., an axis representing actual or relative cost. In the illustrated example, as shown in column 613 of table 600, home improvement A was not performed on homes 3 and 5; was a low-end improvement on home 1; medium-end on home 2, and high-end on home 4. Line 850 illustrates an example calculation of an estimated rate of return of home improvement A based on comparing the price differences possibly attributable to home improvement A versus the quality or cost of home improvement A.

Figure 9:
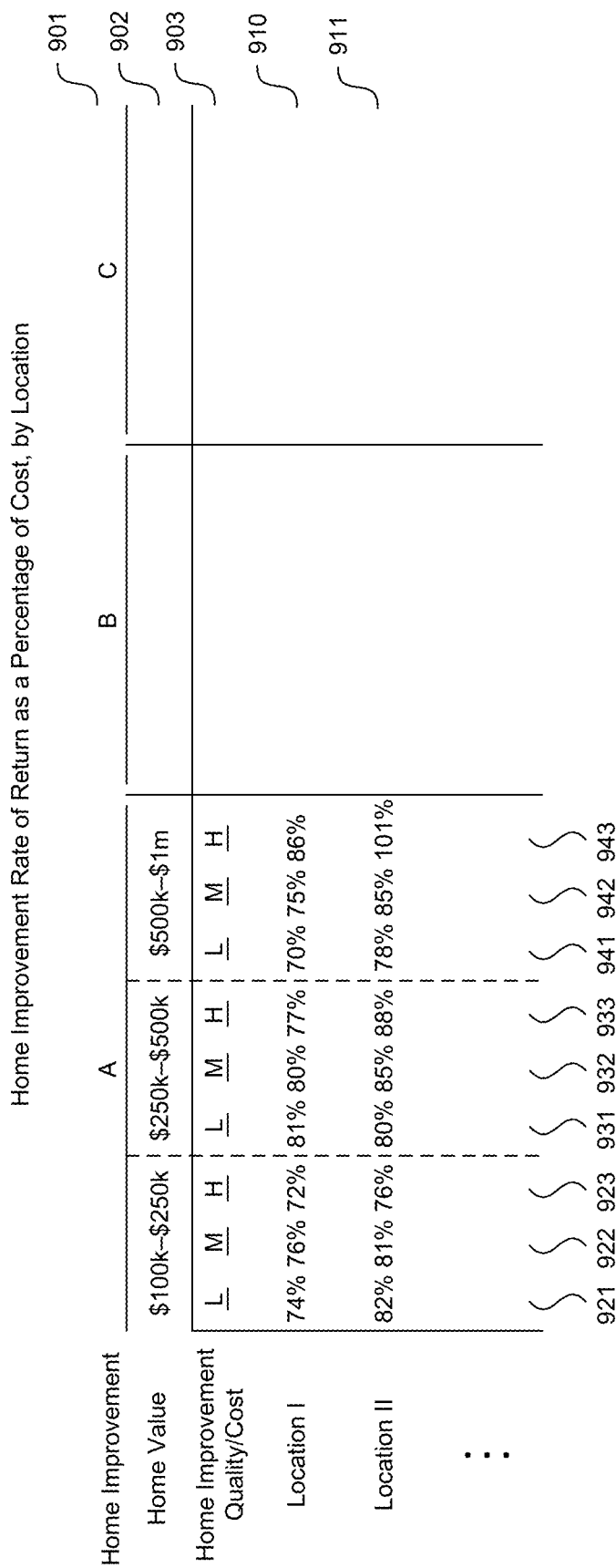
FIG. 9 is a table diagram showing sample contents of a table containing home improvement rates of return as percentages of home improvement cost by location and by home value.

FIG. 9 is a table diagram showing sample contents of a table containing home improvement rates of return as percentages of home improvement cost by location and by home value. The home improvement rates of return table 900 is made up of heading rows 901-903 and data rows 910-911. Heading row 901 represents particular home improvements or home improvement types A, B, C, etc. For example, home improvement type A might be a kitchen remodel. Heading row 902 represents home value ranges or bands. For example, the rate of return of various home improvements may depend on the value of the home on which the improvement is performed. In the illustrated example, row 902 for home improvement A provides separate rates of return for homes valued between $100,000 and $250,000; homes valued between $250,000 and $500,000; and homes valued between $500,000 and $1,000,000. Heading row 903 represents home improvement quality or cost ranges or bands, e.g., low, medium, or high for each home improvement and home value range. Such quality or cost measurements may be, e.g., discrete or continuous, coarse or fine-grained, and absolute or relative.

Each data row 910-911 is divided into the columns indicated by the header rows: for example, for home improvement A for a home valued between $100,000 and $250,000, the rates of return for a low, medium, and high quality/cost home improvement are shown in columns 921, 922, and 923, respectively. For example, row 910 indicates that for such a home in Location I, the expected rate of return of a low-end home improvement of type A is approximately 74% of its cost, and the expected rate of return of a high-end home improvement of type A is approximately 72% of its cost. In Location II, on the other hand, for a home valued between $500,000 and $1,000,000, as shown in columns 941, 942, and 943, the expected rate of return of a low-end home improvement of type A is approximately 78% of its cost, and the expected rate of return of a high-end home improvement of type A is approximately 101% of its cost.

FIG. 10 is a display diagram showing a way in which information about an individual home including a home improvement rate of return generated by the facility may be presented. The display 1000 includes information 1001 about the home. Despite the fact that the home has not been sold recently, the facility also displays a valuation 1002 and a confidence interval of valuation estimates 1003 for the home, enabling prospective buyers and listing agents to gauge their interest in the home, or permitting the home's owner to gauge his or her interest in listing the home for sale. It also displays a home improvement rate of return statistic—e.g., as shown here, a post-home improvement sale price estimate 1004 for a high-end kitchen remodel of the home.

In various embodiments, other home improvement rates of return are shown in a variety of ways. For example, in a display of information about a home similar to display 1000, the facility can display an estimate or a range of estimates of a percentage by which one or more home improvements would change the value of the home. The facility can also present home improvement rate of return information in other types of displays, e.g., a display configured to provide a homeowner information and guidance on whether to perform a home improvement. For example, in one embodiment, the facility displays a rate of return estimate in the form of a values of a home improvement for a particular home (e.g., how much the addition of a ¾ bathroom would add to the home's value). In another embodiment, the facility displays a rate of return estimate in the form of a percentage of an improvement's costs that the homeowner is likely to recoup upon sale of the home (e.g., replacing galvanized pipe with copper might cost $8,000, and add $5,000 to the home's actual or estimated value, for a rate of return percentage of 62.5%). In some embodiments, the facility displays a home improvement rate of return that varies over time: for example, for a new roof, the facility may display a rate of return that is high immediately after installation but falls over time. In some embodiments, the facility displays home improvements for a home ranked by one or more estimated rates of return (e.g., dollar value to the home, percentage effect on the home's value, or percentage of the improvement's cost added to the home's value).

In some embodiments, the facility displays rates of return of home improvements by region. For example, the facility can display rates of return for a particular type of improvement for one or more geographic areas. In one embodiment, the facility displays a map showing rates of return for one or more types of home improvement. The map visually shows how rates of return vary by location, e.g., by neighborhood, city, county, state, etc. In some embodiments, for a given geographic area (e.g., radius from a location, ZIP code, metropolitan area, legislative district, country, etc.), the facility displays a rate of return for the geographic area for each of one or more home improvement types.

CONCLUSION

It will be appreciated by those skilled in the art that the above-described facility may be straightforwardly adapted or extended in various ways. For example, the facility may use a wide variety of modeling techniques, house attributes, and/or data sources. The facility may display or otherwise present its home improvement rates of return in a variety of ways. While the foregoing description makes reference to particular embodiments, the scope of the invention is defined solely by the claims that follow and the elements recited therein.

We claim:

1. A non-transitory, computer-readable medium having contents configured to cause a computing system having a processor to perform a method for estimating an impact on home value of a home improvement for a set of homes in a geographic area, wherein each home has home attribute values, the method comprising:
   training a model;
   using the trained model, obtaining an automatic valuation of a first home in the geographic area based on attribute values of the first home;
   calculating a difference between the automatic valuation of the first home obtained using the trained model and a first price associated with the first home; and
   estimating a rate of return of at least one home improvement based at least in part on the calculated difference.

2. The non-transitory, computer-readable medium of claim 1, the method further comprising:
   accessing data describing at least one home improvement previously performed on the first home.

3. The non-transitory, computer-readable medium of claim 1, wherein training the model comprises:
   constructing a forest of classification trees, wherein constructing a first tree of the forest of classification trees comprises:
      selecting a plurality of sold homes within the geographic area,
      creating a root node for the first tree of the forest of classification trees,
      for a first node of the first tree of the forest of classification trees,
         determining that the first node of the first tree of the forest of classification trees should be split, and
         creating a pair of child nodes for the first node of the first tree of the forest of classification trees, and
      for a second node of the first tree of the forest of classification trees,
         determining a mean price of basis sales represented by the second node of the first tree of the forest of classification trees.

4. The non-transitory, computer-readable medium of claim 1, the method further comprising:
   assigning home attribute values as variables in a polynomial equation, wherein training the model includes assigning coefficients to independent variables in the polynomial equation.

5. The non-transitory, computer-readable medium of claim 1, wherein the first price is a synthetic sale price.

6. The non-transitory, computer-readable medium of claim 1, wherein the model is a statistical model.

7. The non-transitory, computer-readable medium of claim 6, wherein the statistical model is a neural network.

8. A computing system for estimating an impact on home value of a home improvement for a set of homes in a geographic area, wherein each home has home attribute values, the computing system comprising:
   one or more processors;
   one or more memories;
   a component configured to train a model;
   a component configured to, using the trained model, obtain an automatic valuation of a first home in the geographic area based on attribute values of the first home;
   a component configured to calculate a difference between the automatic valuation of the first home obtained using the trained model and a first price associated with the first home; and
   a component configured to estimate a rate of return of at least one home improvement based at least in part on the calculated difference,
   wherein each of the components comprises computer-executable instructions stored in the one or more memories for execution by the computing system.

9. The computing system of claim 8, wherein the estimated rate of return of the home improvement is a dollar value or a percentage of a home's actual or estimated value.

10. The computing system of claim 9, further comprising:
    a component configured to apply the estimated rate of return of the home improvement to the automatic valuation of the first home obtained using the trained model.

11. The computing system of claim 8, further comprising:
    a component configured to, for each of a plurality of types of home improvements, estimate a rate of return of the home improvement of the particular type for the geographic area.

12. The computing system of claim 8, wherein the model is a hedonic regression model.

13. The computing system of claim 8, wherein the model is a neural network.

14. The computing system of claim 8, further comprising:
    a component configured to access information about home improvements performed on the first home, wherein the information about home improvements performed on the first home include at least one actual cost, at least one estimated cost, at least one quality band rating, and at least one approximated date.

15. A method for estimating an impact on home value of a home improvement for a set of homes in a geographic area, wherein each home has home attribute values, the method comprising:
    training a model;
    using the trained model, obtaining an automatic valuation of a first home in the geographic area based on attribute values of the first home;
    calculating a difference between the automatic valuation of the first home obtained using the trained model and a first price associated with the first home; and
    estimating a rate of return of at least one home improvement based at least in part on the calculated difference.

16. The method of claim 15, further comprising:
    constraining the estimated rate of return to be non-negative, wherein constraining the estimated rate of return of the home improvement to be non-negative includes, if the obtained automatic valuation of the first home exceeds the first price, then before determining a portion of calculated differences attributable to the home improvement, performing at least one of excluding the first home from a set of homes for which information is accessed and excluding the first home from homes having a home improvement of a particular type.

17. The method of claim 15, further comprising:
storing a home improvement rate of return model data structure that maps from attributes of a home in a geographic location including an automatic valuation and actual or prospective home improvement information to an estimated rate of return on the home improvement for the home, the rate of return model data structure comprising:
- a plurality of entries, each entry corresponding to a home attribute or combination of home attributes and home improvement information, and each entry comprising data that, for each of one or more values or ranges of values, corresponds to an estimated rate of return on the home improvement.

18. The method of claim 15, further comprising:
storing a data structure comprising information adapted to cause a display device to display a rate of return of a type of home improvement calculated by analysis of differences between automatic valuations and actual sales of homes upon which the type of home improvement has been performed, wherein the analysis includes at least one of a regression and a residual analysis.

19. The method of claim 15, wherein the first price is a listing price.

20. The method of claim 15, further comprising:
for each of a plurality of home attribute value ranges,
- limiting the homes in the set of the homes to homes having home attribute values in the home attribute value range, and
- estimating a rate of return of the home improvement of a particular type for homes having home attribute values in the home attribute value range.

* * * * *